United States Patent
Evangelidis

(10) Patent No.: US 12,243,266 B2
(45) Date of Patent: Mar. 4, 2025

(54) DEVICE PAIRING USING MACHINE-READABLE OPTICAL LABEL

(71) Applicant: Snap Inc., Santa Monica, CA (US)

(72) Inventor: Georgios Evangelidis, Vienna (AT)

(73) Assignee: Snap Inc., Santa Monica, CA (US)

( * ) Notice: Subject to any disclaimer, the term of this patent is extended or adjusted under 35 U.S.C. 154(b) by 70 days.

(21) Appl. No.: 18/124,099

(22) Filed: Mar. 21, 2023

(65) Prior Publication Data

US 2024/0221212 A1 Jul. 4, 2024

(30) Foreign Application Priority Data

Dec. 29, 2022 (GR) ............................. 20220101085

(51) Int. Cl.
*G06T 7/73* (2017.01)

(52) U.S. Cl.
CPC ...... *G06T 7/74* (2017.01); *G06T 2207/30204* (2013.01); *G06T 2207/30244* (2013.01)

(58) Field of Classification Search
CPC ............. G06T 7/74; G06T 2207/30204; G06T 2207/30244
See application file for complete search history.

(56) References Cited

U.S. PATENT DOCUMENTS

| | | |
|---|---|---|
| 5,880,731 A | 3/1999 | Liles et al. |
| 6,023,270 A | 2/2000 | Brush et al. |
| 6,223,165 B1 | 4/2001 | Lauffer |
| 6,772,195 B1 | 8/2004 | Hatlelid et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van et al. |

(Continued)

FOREIGN PATENT DOCUMENTS

| | | |
|---|---|---|
| CN | 109863532 | 6/2019 |
| CN | 110168478 | 8/2019 |

(Continued)

OTHER PUBLICATIONS

"U.S. Appl. No. 17/248,981, Non Final Office Action mailed Sep. 30, 2021", 30 pgs.

(Continued)

*Primary Examiner* — Thai Q Tran
*Assistant Examiner* — Jose M Mesa
(74) *Attorney, Agent, or Firm* — Schwegman Lundberg & Woessner, P.A.

(57) ABSTRACT

A method for aligning coordinate systems from separate augmented reality (AR) devices is described. In one aspect, a first device accesses first pose data from a first Visual Inertial Odometry (VIO) system of the first device. A camera of the first device captures an image of a machine-readable code that is displayed on a display of a second device. The second device encodes the machine-readable code with second pose data from a second VIO system of the second device. The first device decodes the second pose data from the machine-readable code, and determines a relative pose between the first device and the second device based on the first pose data and the second pose data.

20 Claims, 12 Drawing Sheets

(56) References Cited

U.S. PATENT DOCUMENTS

| | | |
|---|---|---|
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,430,310 B1 | 4/2013 | Ho et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,269,180 B2 | 4/2019 | Yamamoto et al. |
| 10,362,219 B2 | 7/2019 | Wilson et al. |
| 10,387,484 B2 | 8/2019 | Kennedy et al. |
| 10,475,225 B2 | 11/2019 | Park et al. |
| 10,504,266 B2 | 12/2019 | Blattner et al. |
| 10,572,005 B2 | 2/2020 | Zahn et al. |
| 10,573,048 B2 | 2/2020 | Ni et al. |
| 10,645,092 B1 | 5/2020 | Bonar et al. |
| 10,657,701 B2 | 5/2020 | Osman et al. |
| 10,764,053 B2 | 9/2020 | Brook et al. |
| 11,233,799 B1 | 1/2022 | Whyte et al. |
| 11,360,733 B2 | 6/2022 | Cardenas Gasca et al. |
| 11,553,049 B2 | 1/2023 | Tsuji |
| 11,812,194 B1 | 11/2023 | Vandyke et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0094417 A1 | 4/2008 | Cohen |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0214585 A1 | 8/2012 | Paquet |
| 2013/0103760 A1 | 4/2013 | Golding et al. |
| 2013/0134212 A1 | 5/2013 | Chang |
| 2013/0201187 A1 | 8/2013 | Tong et al. |
| 2013/0249948 A1 | 9/2013 | Reitan |
| 2013/0257877 A1 | 10/2013 | Davis |
| 2013/0286004 A1 | 10/2013 | Mcculloch et al. |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2014/0281522 A1 | 9/2014 | Bortnem et al. |
| 2015/0062162 A1 | 3/2015 | Kim et al. |
| 2015/0206349 A1 | 7/2015 | Rosenthal et al. |
| 2016/0021148 A1 | 1/2016 | Ijaz |
| 2016/0134840 A1 | 5/2016 | Mcculloch |
| 2016/0234149 A1 | 8/2016 | Tsuda et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |

(56) References Cited

U.S. PATENT DOCUMENTS

| | | |
|---|---|---|
| 2017/0192495 A1 | 7/2017 | Drinkwater et al. |
| 2017/0199855 A1 | 7/2017 | Fishbeck |
| 2017/0235848 A1 | 8/2017 | Van Deusen et al. |
| 2017/0310934 A1 | 10/2017 | Du et al. |
| 2017/0312634 A1 | 11/2017 | Ledoux et al. |
| 2018/0047200 A1 | 2/2018 | O'Hara et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0054379 A1 | 2/2019 | Ackley et al. |
| 2019/0057616 A1 | 2/2019 | Cohen et al. |
| 2019/0087801 A1 | 3/2019 | Govindarajan et al. |
| 2019/0151757 A1 | 5/2019 | Kozloski et al. |
| 2019/0188920 A1 | 6/2019 | Mcphee et al. |
| 2019/0222654 A1 | 7/2019 | Singhal et al. |
| 2019/0310757 A1 | 10/2019 | Lee et al. |
| 2019/0356705 A1 | 11/2019 | Escudero et al. |
| 2020/0089313 A1 | 3/2020 | Himane |
| 2020/0098187 A1 | 3/2020 | Herscher et al. |
| 2020/0167120 A1 | 5/2020 | Rakshit et al. |
| 2020/0360823 A1 | 11/2020 | Cahill et al. |
| 2021/0043005 A1 | 2/2021 | Arora et al. |
| 2021/0051147 A1 | 2/2021 | Hardy et al. |
| 2021/0124180 A1 | 4/2021 | Amadio |
| 2021/0150295 A1* | 5/2021 | Rangaprasad ............ G06T 7/90 |
| 2021/0185471 A1* | 6/2021 | Jot ......................... H04R 1/028 |
| 2021/0364811 A1 | 11/2021 | Amadio |
| 2021/0398314 A1 | 12/2021 | Sivalingam et al. |
| 2021/0409954 A1 | 12/2021 | Frisk et al. |
| 2022/0075591 A1 | 3/2022 | Cardenas Gasca et al. |
| 2022/0101000 A1 | 3/2022 | Tham et al. |
| 2023/0095621 A1* | 3/2023 | Gorur Sheshagiri ... G06T 7/246 382/103 |
| 2024/0032121 A1 | 1/2024 | Zhuang et al. |

FOREIGN PATENT DOCUMENTS

| | | |
|---|---|---|
| EP | 2184092 | 5/2010 |
| JP | 2001230801 | 8/2001 |
| JP | 5497931 | 3/2014 |
| KR | 20120040000 | 4/2012 |
| KR | 101445263 | 9/2014 |
| WO | 2003094072 | 11/2003 |
| WO | 2004095308 | 11/2004 |
| WO | 2006107182 | 10/2006 |
| WO | 2007134402 | 11/2007 |
| WO | 2012139276 | 10/2012 |
| WO | 2013027893 | 2/2013 |
| WO | 2013152454 | 10/2013 |
| WO | 2013166588 | 11/2013 |
| WO | 2014031899 | 2/2014 |
| WO | 2014182638 | 11/2014 |
| WO | 2014194439 | 12/2014 |
| WO | 2015094220 | 6/2015 |
| WO | 2016090605 | 6/2016 |
| WO | 2018081013 | 5/2018 |
| WO | 2018102562 | 6/2018 |
| WO | 2018129531 | 7/2018 |
| WO | 2019089613 | 5/2019 |
| WO | 2020017682 | 1/2020 |
| WO | 2022056132 | 3/2022 |
| WO | 2024020389 | 1/2024 |
| WO | 2024145124 | 7/2024 |

OTHER PUBLICATIONS

"U.S. Appl. No. 17/248,981, Response filed Dec. 20, 2021 to Non Final Office Action mailed Sep. 30, 2021", 11 pgs.

"U.S. Appl. No. 17/248,981, Notice of Allowance mailed Feb. 16, 2022", 12 pgs.

"International Application Serial No. PCT US2021 049672, Invitation to Pay Additional Fees mailed Jan. 14, 2022", 15 pgs.

"International Application Serial No. PCT US2021 049672, International Search Report mailed Mar. 9, 2022", 6 pgs.

"International Application Serial No. PCT US2021 049672, Written Opinion mailed Mar. 9, 2022", 15 pgs.

"International Application Serial No. PCT US2023 070415, International Search Report mailed Nov. 3, 2023", 5 pgs.

"International Application Serial No. PCT US2023 070415, Written Opinion mailed Nov. 3, 2023", 4 pgs.

"International Application Serial No. PCT US2023 085194, International Search Report mailed May 28, 2024", 5 pgs.

"International Application Serial No. PCT US2023 085194, Written Opinion mailed May 28, 2024", 7 pgs.

Kam, Jae Won, "Robust and Fast Collaborative Augmented Reality Framework Based on Monocular SLAM", IEIE Transactions On Smart Processing andComputing, vol. 9, No. 4, (Aug. 31, 2020), 325-335.

Miller, John, "Cappella Establishing Multi-User Augmented Reality Sessions Using Inertial Estimates and Peer-to-Peer Ranging", 21st ACM IEEE International Conference On Information Processing In Sensor Networks (IPSN), IEEE, (May 4, 2022), 428-440.

Ran, Xukan Xran, "Multi-user augmented reality with communication efficient and spatially consistent virtual objects", Proceedings Of The IEEE ACM 42nd International Conference On Software Engineering Workshops, Acmpub27, New York, NY, USA,, (Nov. 23, 2020), 386-398.

U.S. Appl. No. 17/813,901, filed Jul. 20, 2022, Secure Peer-to-Peer Connections Between Mobile Devices.

"U.S. Appl. No. 17/813,901, Non Final Office Action mailed Aug. 22, 2024", 10 pgs.

"U.S. Appl. No. 17/813,901, Response filed Nov. 21, 2024 to Non Final Office Action mailed Aug. 22, 2024", 10 pgs.

"U.S. Appl. No. 17/813,901, Notice of Allowance mailed Dec. 19, 2024", 8 pgs.

"U.S. Appl. No. 17/813,901, Corrected Notice of Allowance mailed Dec. 20, 2024", 5 pgs.

Pierdicca, Roberto, "The use of augmented reality glasses for the application in industry 4.0", Augmented Reality, Virtual Reality, and Computer Graphics: 4th International Conference, AVR, Ugento, Italy, Proceedings, Part I 4. Springer International Publishing, (Jun. 12-15, 2017), 13 pgs.

\* cited by examiner

DEVICE PAIRING USING MACHINE-READABLE OPTICAL LABEL

CLAIM OF PRIORITY

This application claims the benefit of priority to Greece Patent Application Serial No. 20220101085, filed on Dec. 29, 2022, which is incorporated herein by reference in its entirety.

TECHNICAL FIELD

The subject matter disclosed herein generally relates to an augmented reality (AR) device. Specifically, the present disclosure addresses systems and methods for pairing AR devices.

BACKGROUND

An augmented reality (AR) device enables a user to observe a scene while simultaneously seeing relevant virtual content that may be aligned to items, images, objects, or environments in the field of view of the device. In multiple AR devices, each device has its own 6 degrees of freedom (6DoF) tracker. Sharing AR experiences between multiple AR devices can be difficult because the reference coordinate system (frame) of each device is different. As such, a virtual object displayed in the AR devices can appear different.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
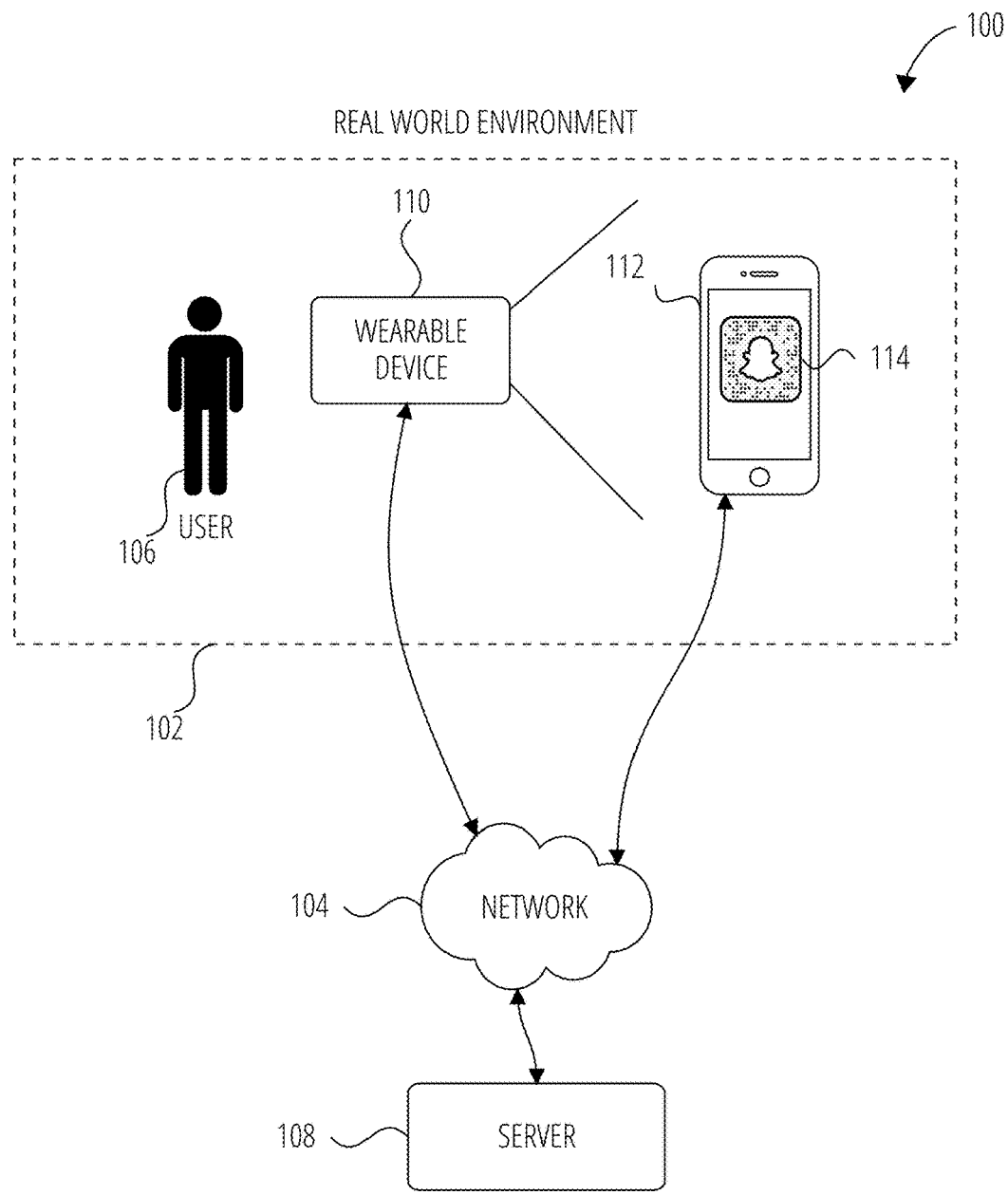
FIG. 1 is a block diagram illustrating a network environment for sharing augmented reality experience in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

The term "augmented reality" (AR) is used herein to refer to an interactive experience of a real-world environment where physical objects that reside in the real-world are "augmented" or enhanced by computer-generated digital content (also referred to as virtual content or synthetic content). AR can also refer to a system that enables a combination of real and virtual worlds, real-time interaction, and 3D registration of virtual and real objects. A user of an AR system perceives virtual content that appears to be attached or interact with a real-world physical object.

The term "virtual reality" (VR) is used herein to refer to a simulation experience of a virtual world environment that is completely distinct from the real-world environment. Computer-generated digital content is displayed in the virtual world environment. VR also refers to a system that enables a user of a VR system to be completely immersed in the virtual world environment and to interact with virtual objects presented in the virtual world environment.

The term "AR application" is used herein to refer to a computer-operated application that enables an AR experience. The term "VR application" is used herein to refer to a computer-operated application that enables a VR experience. The term "AR/VR application" refers to a computer-operated application that enables a combination of an AR experience or a VR experience.

The term "visual tracking system" is used herein to refer to a computer-operated application or system that enables a system to track visual features identified in images captured by one or more cameras of the visual tracking system. The visual tracking system builds a model of a real-world environment based on the tracked visual features. Non-limiting examples of the visual tracking system include: a visual Simultaneous Localization and Mapping system (VSLAM), and Visual Inertial Odometry (VIO) system. VSLAM can be used to build a target from an environment, or a scene based on one or more cameras of the visual tracking system. A VIO system (also referred to as a visual-inertial tracking system) determines a latest pose (e.g., position and orientation) of a device based on data acquired from multiple sensors (e.g., optical sensors, inertial sensors) of the device.

The term "Inertial Measurement Unit" (IMU) is used herein to refer to a device that can report on the inertial status of a moving body including the acceleration, velocity, orientation, and position of the moving body. An IMU enables tracking of movement of a body by integrating the acceleration and the angular velocity measured by the IMU. IMU can also refer to a combination of accelerometers and gyroscopes that can determine and quantify linear acceleration and angular velocity, respectively. The values obtained from the IMUs gyroscopes can be processed to obtain the pitch, roll, and heading of the IMU and, therefore, of the body with which the IMU is associated. Signals from the IMU's accelerometers also can be processed to obtain velocity and displacement of the IMU.

The term "three-degrees of freedom tracking system" (3DOF tracking system) is used herein to refer to a device that tracks rotational movement. For example, the 3DOF tracking system can track whether a user of a head-wearable device is looking left or right, rotating their head up or down, and pivoting left or right. However, the head-wearable device cannot use the 3DOF tracking system to determine whether the user has moved around a scene by moving in the physical world. As such, 3DOF tracking system may not be accurate enough to be used for positional signals. The 3DOF tracking system may be part of an AR/VR display device that includes IMU sensors. For example, the 3DOF tracking system uses sensor data from sensors such as accelerometers, gyroscopes, and magnetometers.

The term "six-degrees of freedom tracking system" (6DOF tracking system) is used herein to refer to a device that tracks rotational and translational motion. For example, the 6DOF tracking system can track whether the user has rotated their head and moved forward or backward, laterally, or vertically and up or down. The 6DOF tracking system may include a Simultaneous Localization and Mapping (SLAM) system and/or a VIO system that relies on data acquired from multiple sensors (e.g., depth cameras, inertial sensors). The 6DOF tracking system analyzes data from the sensors to accurately determine the pose of the display device.

Each AR device may include its own 6DOF tracking system that generates its own reference coordinate system/ frame. As such, two or more AR devices may have two or more different reference coordinate systems that are to be aligned to express the pose of any of the AR devices in a common coordinate system. Standard solutions include area scanning and the use of a fiducial marker (e.g., a predefined 2D image) to synchronize the coordinate systems of each AR device.

The present application describes a system that enables two AR devices (e.g., a handheld smartphone and a head-wearable device) to pair and share an AR experience by aligning the different coordinate systems of each AR device. In order to share AR experiences, the coordinates systems are aligned, so that poses (e.g., 3D position and orientation) of the devices are expressed in a common coordinate system or in two different but aligned coordinate systems. The system uses machine-readable code that encodes pose data of one device (e.g., smartphone) and a decoder at the wearable device that captures an image of the machine-readable code, decodes the pose data of the smartphone, accesses the pose data of the wearable device, and aligns the coordinate systems of both the smartphone and the wearable device based on pose data. The system determines a relative pose of the AR devices (e.g., relative pose between VIO reference frames) and uses the relative pose to align in 3D the VIO reference coordinate frames of the AR devices for shared AR experiences.

In one example, the present application describes sharing AR experience between a wearable device and a smartphone by aligning the reference Coordinate Systems (CS) of 6DOF trackers of the two devices. The pose of both devices can be expressed in a common CS, or in two different yet aligned CS. The common CS is referred to as a reference CS and a world CS. The smartphone displays a machine-readable code on its screen. The machine-readable code encodes the current VIO pose of the smartphone and metadata (e.g., calibration parameters of the smartphone, parameters based on the location of the camera of the smartphone relative to the screen of the smartphone, time information). The wearable device captures a picture of the machine-readable code. This code visually communicates the VIO pose of the smartphone to the wearable device and is then used to determine the relative pose between the wearable device and the smartphone.

In one example embodiment, a method for aligning coordinate systems from separate augmented reality (AR) devices is described. In one aspect, a method for aligning coordinate systems from separate augmented reality (AR) devices is described. In one aspect, a first device accesses first pose data from a first Visual Inertial Odometry (VIO) system of the first device. A camera of the first device captures an image of a machine-readable code that is displayed on a display of a second device. The second device encodes the machine-readable code with second pose data from a second VIO system of the second device. The first device decodes the second pose data from the machine-readable code, and determines a relative pose between the first device and the second device based on the first pose data and the second pose data. For example, the first device determines the relative pose between the reference CS of the 6DOF tracker (VIO) of the first device and the reference CS of the 6DOF tracker (VIO) of the second device based on the first pose data, the second pose data, and the appearance of the known pattern (e.g., second predefined pattern) that is displayed along with the machine-readable code.

As a result, one or more of the methodologies described herein facilitate solving the technical problem of resource management from aligning coordinate systems from separate augmented reality (AR) devices. The presently described method provides an improvement to an operation of the functioning of a computer by providing power consumption reduction. As such, one or more of the methodologies described herein may obviate a need for certain efforts or computing resources. Examples of such computing resources include processor cycles, network traffic, memory usage, data storage capacity, power consumption, network bandwidth, and cooling capacity.

FIG. 1 is a network diagram illustrating a network environment 100 suitable for operating a wearable device 110, a mobile device 112, and a server 108, according to some example embodiments. The network environment 100 includes the wearable device 110, the mobile device 112, and the server 108, communicatively coupled to each other via a network 104. The wearable device 110, mobile device 112, and the server 108 may each be implemented in a computer system, in whole or in part, as described below with respect to FIG. 12. The server 108 may be part of a network-based system. For example, the network-based system may be or include a cloud-based server system that provides additional information, such alignment data of the wearable device 110 and mobile device 112.

A user 106 operates the wearable device 110. The user 106 may be a human user (e.g., a human being), a machine user (e.g., a computer configured by a software program to interact with the Wearable device 110), or any suitable combination thereof (e.g., a human assisted by a machine or a machine supervised by a human). The user 106 operates the wearable device 110 by pointing the wearable device 110 towards a screen of the mobile device 112 in the real world environment 102. The screen displays a machine-readable code 114.

The mobile device 112 may be a computing device with a display such as a smartphone, a tablet computer. FIG. 1 illustrates the user 106 holding the mobile device 112. The wearable device 110 may be a head-wearable device with a transparent display. For example, the display of the wearable device 110 may be implemented as transparent lenses of wearable computing glasses, that allow a user to view content presented on the display while simultaneously viewing real world object visible through the display.

The user 106 operates an AR application of the wearable device 110. The AR application may be configured to provide the user 106 with an AR experience triggered by a physical object, such as a two-dimensional physical object (e.g., a picture), a three-dimensional physical object (e.g., a statue), a location (e.g., at factory), or any references (e.g., perceived corners of walls or furniture) in the real world environment 102. In the example of FIG. 1, the wearable device 110 operates a sharing application that uses a camera of the wearable device 110 to capture an image of the machine-readable code 114 presented on the mobile device 112.

The wearable device 110 includes a tracking system (not shown). The tracking system tracks the pose (e.g., position and orientation) of the wearable device 110 relative to the real world environment 102 using a 6DoF system or a combination of optical sensors (e.g., image camera), inertia sensors (e.g., gyroscope, accelerometer), wireless sensors (Bluetooth, Wi-Fi), GPS sensor, and audio sensor to determine the location of the wearable device 110 within the real world environment 102.

The mobile device 112 includes its own tracking system (not shown). The tracking system tracks the pose (e.g., position and orientation) of the mobile device 112 relative to the real world environment 102 using its own 6DoF system or a combination of optical sensors (e.g., image camera), inertia sensors (e.g., gyroscope, accelerometer), wireless sensors (Bluetooth, Wi-Fi), GPS sensor, and audio sensor to determine the location of the mobile device 112 within the real world environment 102. In one example, the mobile device 112 uses its 6DoF system to generate pose data of the mobile device 112 and encodes the pose data in the machine-readable code 114.

In one example embodiment, the mobile device 112 communicates with the wearable device 110 via the network 104 and server 108. For example, the wearable device 110 computes the relative pose between the wearable device 110 and the mobile device 112 and communicates the relative pose to the mobile device 112 via the server 108. In another example, the computation of the relative pose may be performed on the wearable device 110, the server 108, or a combination of the wearable device 110 and server 108.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 8 and FIG. 9. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 104 may be any network that enables communication between or among machines (e.g., server 108), databases, and devices (e.g., wearable device 110, mobile device 112). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof.

Figure 2:
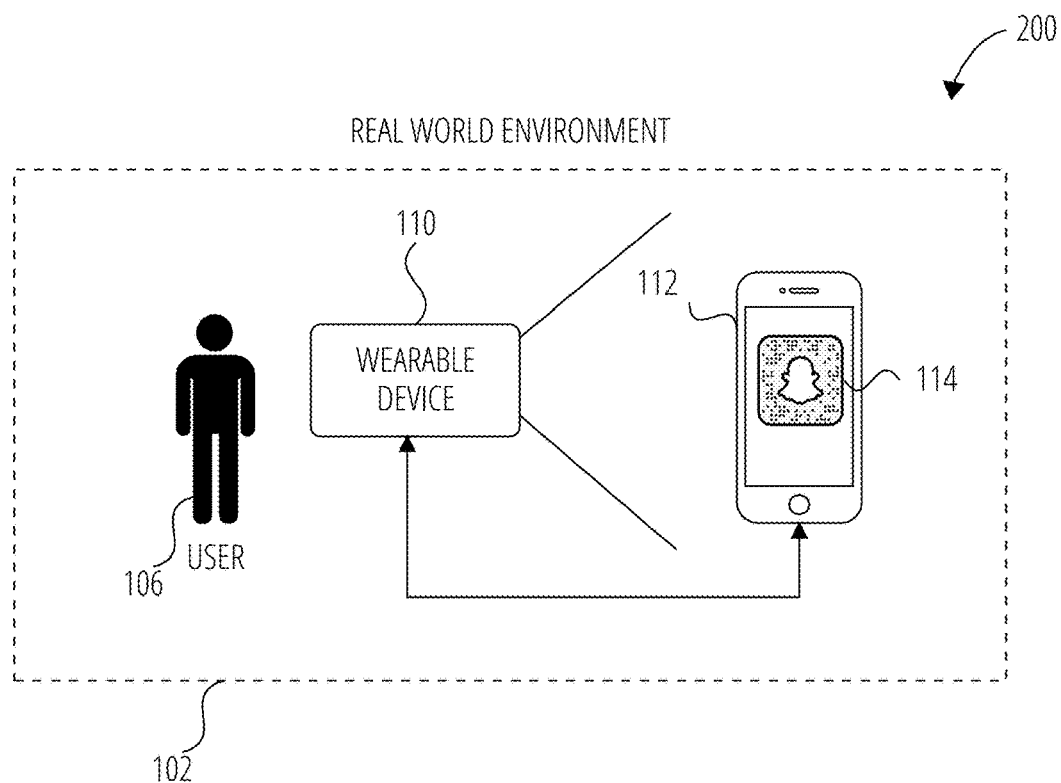
FIG. 2 is a block diagram illustrating a network environment for sharing augmented reality experience in accordance with one example embodiment.

FIG. 2 is a network diagram illustrating a network environment 200 suitable for operating the wearable device 110 and the mobile device 112 according to some example embodiments. The wearable device 110 may communicate directly with the mobile device 112 via wired or wireless signal (e.g., Bluetooth). In one example, the wearable device 110 sends the relative pose data to the mobile device 112 via Bluetooth.

Figure 3:
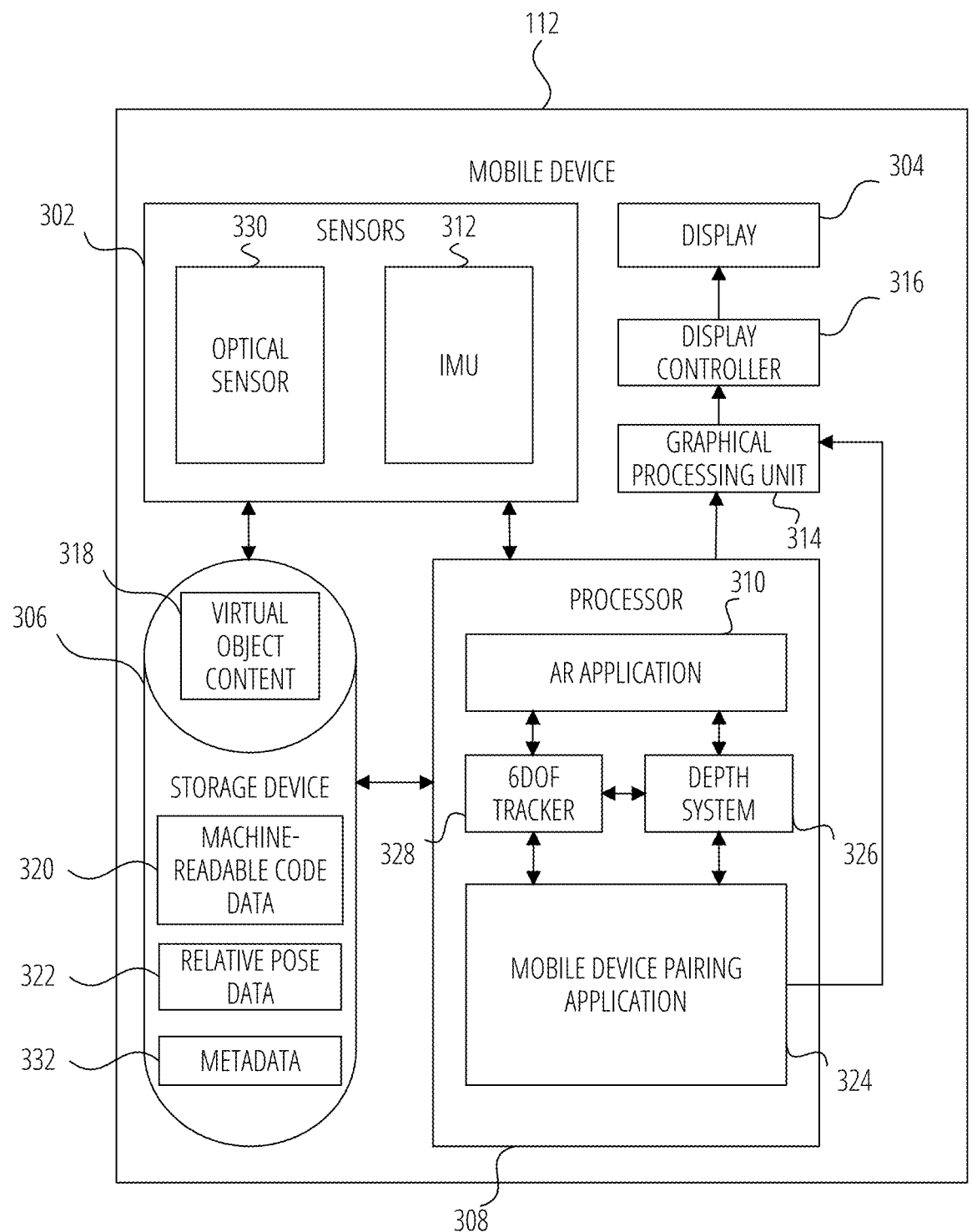
FIG. 3 is a block diagram illustrating a mobile device in accordance with one example embodiment.

FIG. 3 is a block diagram illustrating modules (e.g., components) of the mobile device 112, according to some example embodiments. The mobile device 112 includes sensors 302, a display 304, a processor 308, a graphical processing unit 314, a display controller 316, and a storage device 306. Examples of the mobile device 112 include a tablet computer, or a smart phone.

The sensors 302 include an optical sensor 514 and an IMU 312 (Inertial Motion Unit). The optical sensor 330 includes a camera. The IMU 312 includes a combination of gyroscope, accelerometer, magnetometer. Other examples of sensors 302 include a proximity or location sensor (e.g., near field communication, GPS, Bluetooth, WIFI), an audio sensor (e.g., a microphone), or any suitable combination thereof. It is noted that the sensors 302 described herein are for illustration purposes and the sensors 302 are thus not limited to the ones described above. Other examples of sensors 302 include a depth sensor such as a structured-light sensor, a time-of-flight sensor, passive stereo sensor, and an ultrasound device, time-of-flight sensor.

The display 304 includes a screen or monitor configured to display images generated by the processor 308. In one example embodiment, the display 304 includes a (non-transparent) touchscreen display.

The processor 308 includes an AR application 310, a 6DOF tracker 328, a depth system 326, and a mobile device pairing application 324. The AR application 310 detects and identifies a physical environment, and items (e.g., a physical object) in the physical environments using computer vision. The AR application 310 retrieves a virtual object (e.g., 3D object model) based on the identified item or physical environment. The display 304 displays the virtual object. The AR application 310 includes a local rendering engine that generates a visualization of a virtual object overlaid (e.g., superimposed upon, or otherwise displayed in tandem with) on an image of the item captured by the optical sensor 330. The AR application 310 displays the virtual object such that the virtual object appears anchored to an item in the physical environment. A visualization of the virtual object may be manipulated by adjusting a position of the item (e.g., its physical location, orientation, or both) relative to the optical sensor 330. Similarly, the visualization of the virtual object may be manipulated by adjusting a pose of the mobile device 112 relative to the item.

The 6DOF tracker 328 estimates a pose of the mobile device 112. For example, the 6DOF tracker 328 uses image data and corresponding inertial data from the optical sensor 330 and the IMU 312 to track a location and pose of the mobile device 112 relative to a frame of reference (e.g., real world environment 102). In one example, the 6DOF tracker 328 uses the sensor data to determine the three-dimensional pose of the mobile device 112. The three-dimensional pose is a determined orientation and position of the mobile device 112 in relation to the user's real world environment 102. For example, the mobile device 112 may use images of the user's real world environment 102, as well as other sensor data to identify a relative position and orientation of the mobile device 112 from physical objects in the real world environment 102 surrounding the mobile device 112. The 6DOF tracker 328 continually gathers and uses updated sensor data describing movements of the mobile device 112 to determine updated three-dimensional poses of the mobile device 112 that indicate changes in the relative position and orientation of the mobile device 112 from the physical objects in the real world environment 102. The 6DOF tracker 328 provides the three-dimensional pose of the mobile device 112 to the depth system 326 and the mobile device pairing application 324.

FIG. 3 illustrates an optional depth system 326. The depth system 326 identifies depth of items in the image and generates a dense point cloud. In one example, the depth system 326 includes a depth sensor or a stereo sensor.

The mobile device pairing application 324 accesses pose data from the 6DOF tracker 328 and encodes the pose data in a machine-readable code to be displayed in display 304. In one example, the mobile device pairing application 324 encodes the machine-readable code with the current VIO pose of the mobile device 112 and metadata (e.g., calibration parameters of the mobile device 112, parameters based on the location of the optical sensor 330 of the mobile device 112 relative to the display 304, time information). In one example, the mobile device pairing application 324 limits the display of the machine-readable code to a few frames (e.g., 5 frames) of the display 304 to eliminate or minimize any hand-shaking motion of the mobile device 112.

The mobile device pairing application 324 communicates with the wearable device 110 and receives relative pose data from the wearable device 110. The relative pose data indicates the relative pose between the mobile device 112 and the wearable device 110. The AR application 310 uses the relative pose to enable sharing of AR experience between the mobile device 112 and the wearable device 110. For example, the correct location/perspective of a virtual object is accurately presented in both the mobile device 112 and the wearable device 110 (e.g., user 106 points to a country on a virtual globe using the wearable device 110, the mobile device 112 displays the virtual globe so that the user 106 appears pointing to the same country (as perceived from the perspective of the mobile device 112). Example components of the mobile device pairing application 324 are described further below with respect to FIG. 4.

The graphical processing unit 314 includes a render engine (not shown) that is configured to render a frame of a 3D model of a virtual object based on the virtual content provided by the AR application 310 and the pose of the mobile device 112 (relative to the wearable device 110). In other words, the graphical processing unit 314 uses the three-dimensional pose of the mobile device 112 to generate frames of virtual content to be presented on the display 304. For example, the graphical processing unit 314 uses the three-dimensional pose to render a frame of the virtual content such that the virtual content is presented at an orientation and position in the display 304 to properly augment the user's reality. As an example, the graphical processing unit 314 may use the three-dimensional pose data to render a frame of virtual content such that, when presented on the display 304, the virtual content overlaps/appears anchored to a physical object in the user's real world environment 102. The graphical processing unit 314 generates updated frames of virtual content based on updated three-dimensional poses of the mobile device 112, which reflect changes in the position and orientation of the user in relation to physical objects in the user's real world environment 102.

The graphical processing unit 314 transfers the rendered frame to the display controller 316. The display controller 316 is positioned as an intermediary between the graphical processing unit 314 and the display 304, receives the image data (e.g., rendered frame) from the graphical processing unit 314, and provides the rendered frame to display 304.

The storage device 306 stores virtual object content 318, machine-readable code data 320, relative pose data 322 (e.g., relative pose between mobile device 112 and wearable device 110, common reference frame), and metadata 332. The virtual object content 318 includes, for example, a database of visual references (e.g., images, QR codes) and corresponding virtual content (e.g., three-dimensional model of virtual objects). The machine-readable code data 320 includes, for example, the machine-readable code that encodes the VIO pose of the mobile device 112. The relative pose data 322 indicate relative pose between a reference coordinate frame of the mobile device 112 and a reference coordinate frame of the wearable device 110.

The metadata 332 includes, for example, factory calibration parameters of the mobile device 112, calibration parameters based on the location of the optical sensor 330 of the mobile device 112 relative to the display 304, and time information. In other examples, the metadata 332 includes VIO calibration parameters related to IMU intrinsics, image sensor intrinsics, IMU-image-sensor extrinsics, and IMU-image-sensor time alignment parameters.

For example, the calibration parameters can include intrinsic calibration parameters of the IMU 312 (sometimes referred to herein as "IMU intrinsics"). Examples of calibration parameters that are considered IMU intrinsics include gyroscope scale, gyroscope skewness, accelerometer scale, accelerometer skewness, accelerometer misalignment, gyroscope misalignment, rotation quaternion between the gyroscope and the accelerometer (e.g., "gyro-scope-accelerometer rotation quaternion"), gyroscope bias, and accelerometer bias.

The calibration parameters can include intrinsic calibration parameters of the optical sensor 330 (sometimes referred to herein as "camera intrinsics"). Examples of calibration parameters that are considered camera intrinsics include focal length and the optical center of the optical sensor 330.

The calibration parameters can include extrinsic calibration parameters corresponding to the IMU 312 and the optical sensor 330 (sometimes referred to herein as "IMU-camera extrinsics"). Typically, an unknown transformation exists between the reference frame of the IMU 312 (the "IMU reference frame") and the reference frame of the image sensor (the "camera frame"), and this transformation can be expressed by a rotation quaternion corresponding to the rotation from the optical reference frame to the IMU reference frame and a translation vector corresponding and translation vector corresponding to a translation from the IMU-derived 3D position of mobile device 112 to the optical reference frame. This rotation quaternion and translation vector are examples of calibration parameters that are considered IMU-camera extrinsics.

The calibration parameters can include calibration parameters for performing time alignment between the IMU 312 and the optical sensor 330 (sometimes referred to herein as "IMU-camera time alignment parameters"). An example of a calibration parameter that is considered to be an IMU-camera time alignment parameters includes the time offset between the IMU 312 and the optical sensor 330 (e.g., between time-stamps generated respectively).

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
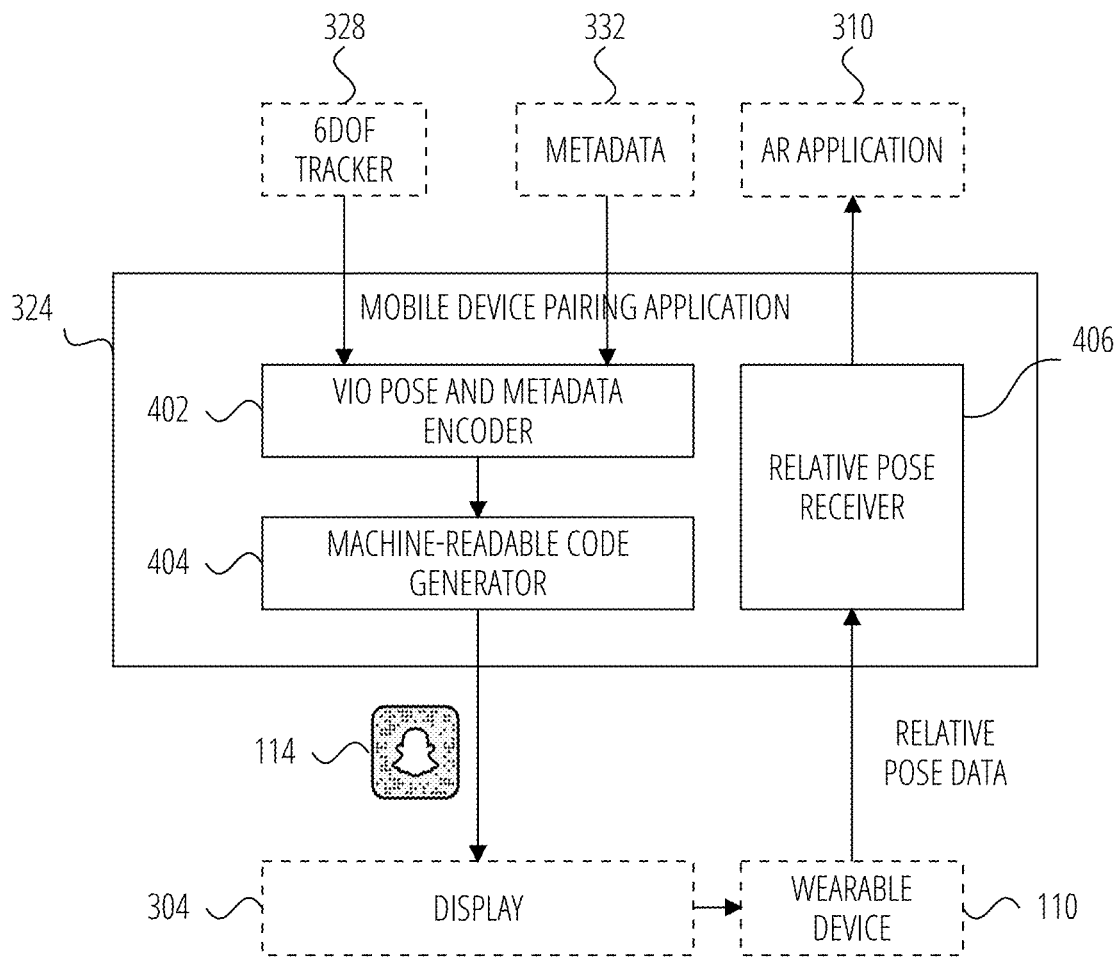
FIG. 4 is a block diagram illustrating a mobile device pairing application in accordance with one example embodiment.

FIG. 4 is a block diagram illustrating the mobile device pairing application 324 in accordance with one example embodiment. The mobile device pairing application 324 includes a VIO pose and metadata encoder 402, machine-readable code generator 404, and a relative pose receiver 406.

The VIO pose and metadata encoder 402 accesses pose data from the 6DOF tracker 328 and the metadata 332 from the storage device 306. The VIO pose and metadata encoder 402 encodes the pose data and the metadata 332 into the machine-readable code 114.

Figure 7:
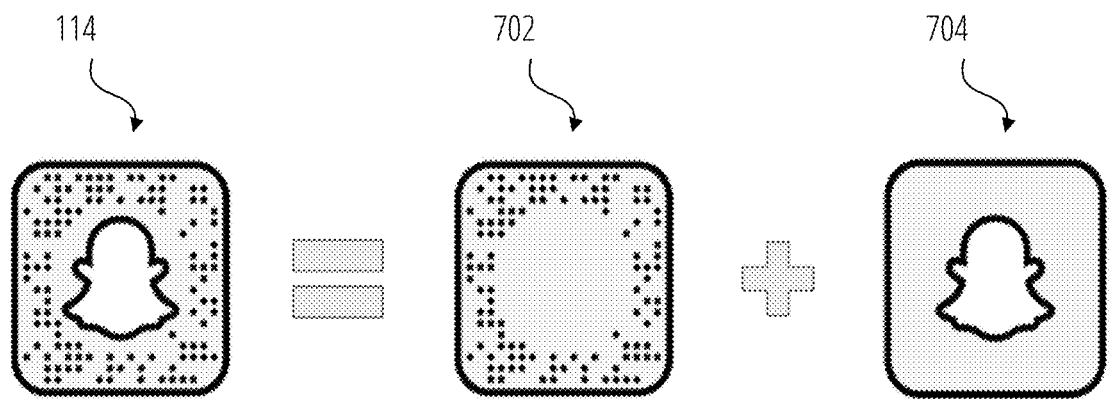
FIG. 7 illustrates an example of a machine-readable code in accordance with one example embodiment.

The machine-readable code generator 404 generates the machine-readable code 114. For example, the machine-readable code 114 includes a custom QR code with an outer portion and an inner portion. The outer portion includes a pattern of dots that encode the pose data and the metadata 332. The inner portion includes a custom pattern (e.g., a predefined second pattern) with predefined dimensions relative to the outer portion. This custom pattern is known to the wearable device 110. For example, the wearable device 110 stores in its memory the predefined second pattern and finds the pose between the mobile device 112 and the wearable device 110 by the second alignment between the predefined second pattern and the deformed-shape (e.g., rotated, shrink) image of the machine-readable code 114 captured by the wearable device 110. FIG. 7 illustrates an example of the machine-readable code 114. The machine-readable code generator 404 provides the machine-readable code 114 for display in the display 304. In one example, the machine-readable code generator 404 configures the display 304 to display the machine-readable code 114 for a limited number of frames to eliminate or minimize any hand-shaking motion of the mobile device 112.

The relative pose receiver 406 communicates with the wearable device 110. In one example, the relative pose receiver 406 receives relative pose data from the wearable device 110. The relative pose data indicates the relative pose between the mobile device 112 and the wearable device 110. The AR application 310 uses the relative pose to enable accurate sharing of AR experience between the mobile device 112 and the wearable device 110 by "synchronizing"/"aligning" the frame of references of each device. For example, the location/perspective of a virtual object is presented within a common frame of reference in both the mobile device 112 and the wearable device 110.

The AR application 310 uses the relative pose to align in the VIO reference coordinate frames of each AR device. It is noted that once the alignment is performed, the wearable device 110 and the mobile device 112 are considered "paired" because they share a common reference frame. Once paired, the AR devices (e.g., wearable device 110 and mobile device 112) do not need to be synced again. As such, the relative pose computation is performed only when the wearable device 110 and mobile device 112 are connected during a joint collaborative AR session (e.g., each AR device view a "same" virtual object in the real world environment 102). In another example, the relative pose receiver 406 provides alignment data (e.g., relative pose of mobile device 112 relative to wearable device 110) to the AR application 310/graphical processing unit 314 for accurate placement/display of a virtual object.

Figure 5:
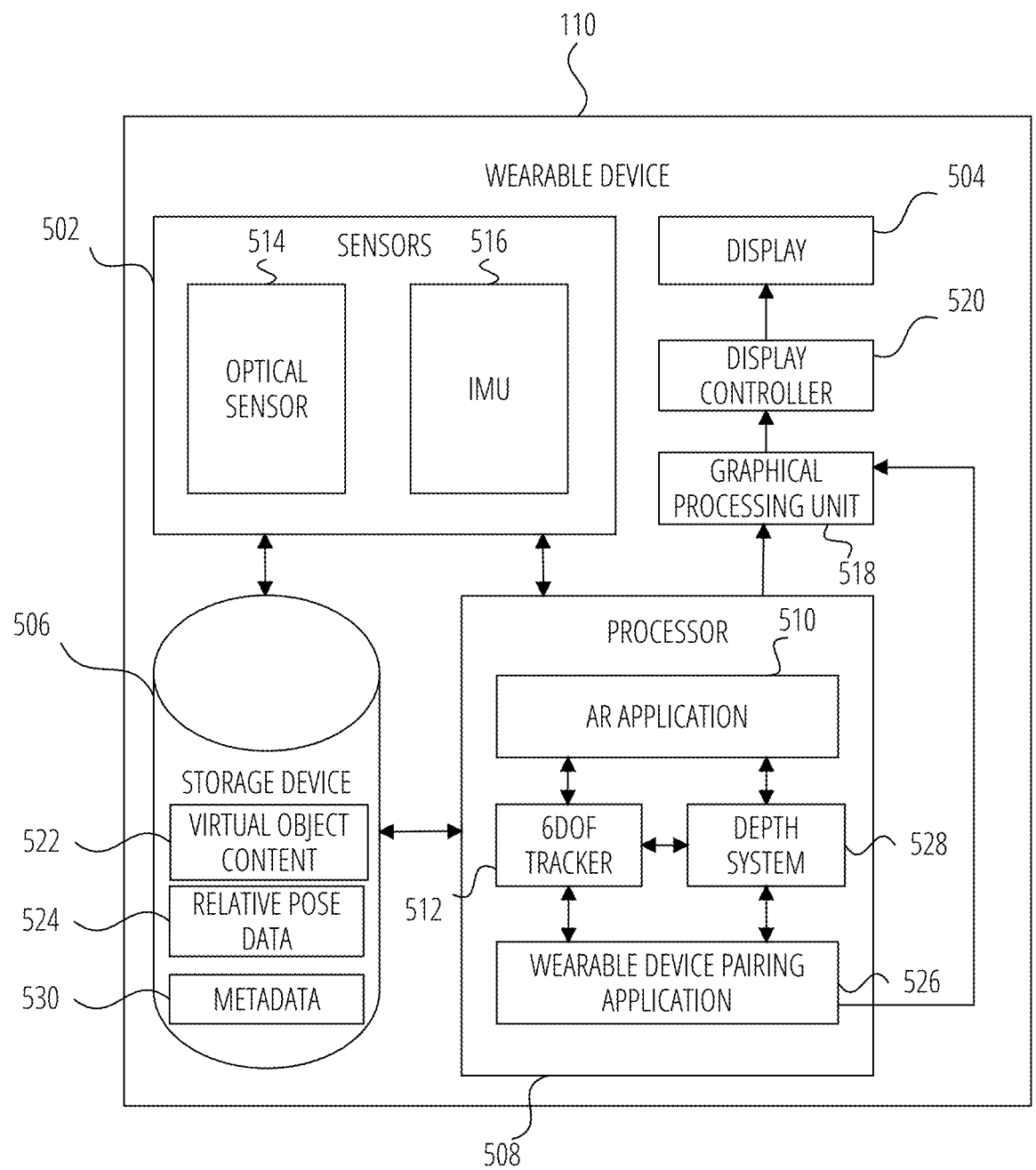
FIG. 5 is a block diagram illustrating a wearable device in accordance with one example embodiment.

FIG. 5 is a block diagram illustrating modules (e.g., components) of the wearable device 110, according to some example embodiments. The wearable device 110 includes sensors 502, a display 504, a processor 508, a graphical processing unit 518, a display controller 520, and a storage device 506. Examples of the wearable device 110 include a wearable computing device such as a head-wearable device (e.g., smart glasses).

The sensors 502 include an optical sensor 514 and an IMU 516. The optical sensor 514 includes a monocular camera. The IMU 516 includes a combination of gyroscope, accelerometer, magnetometer. Other examples of sensors 502 include a proximity or location sensor (e.g., near field communication, GPS, Bluetooth, Wifi), an audio sensor (e.g., a microphone), or any suitable combination thereof. It is noted that the sensors 502 described herein are for illustration purposes and the sensors 502 are thus not limited to the ones described above. In one example embodiment, the optical sensor 514 also includes a depth sensor such as a structured-light sensor, a time-of-flight sensor, passive stereo sensor, and an ultrasound device, time-of-flight sensor.

The display 504 includes a screen or monitor configured to display images generated by the processor 508. In one example embodiment, the display 504 may be transparent or semi-transparent so that the user 106 can see through the display 504 (in AR use case). In another example, the display 504 presents each frame of virtual content in multiple presentations.

The processor 508 includes an AR application 510, a 6DOF tracker 512, a depth system 528, and a wearable device pairing application 526. The AR application 510 detects and identifies a physical environment or items in the physical environment using computer vision. The AR application 510 retrieves a virtual object (e.g., 3D object model) based on the identified item or physical environment. The display 504 displays the virtual object. The AR application 510 includes a local rendering engine that generates a visualization of a virtual object overlaid (e.g., superimposed upon, or otherwise displayed in tandem with) on or anchored to an image of an item captured by the optical sensor 514. A visualization of the virtual object may be manipulated by adjusting a position of the item (e.g., its physical location, orientation, or both) relative to the optical sensor 514. Similarly, the visualization of the virtual object may be manipulated by adjusting a pose of the wearable device 110 relative to the item.

The 6DOF tracker 512 estimates a pose of the wearable device 110. For example, the 6DOF tracker 512 uses image data and corresponding inertial data from the optical sensor 514 and the IMU 516 to track a location and pose of the wearable device 110 relative to a frame of reference (e.g., real world environment 102). In one example, the 6DOF tracker 512 uses the sensor data to determine the three-dimensional pose of the wearable device 110. The three-dimensional pose is a determined orientation and position of the wearable device 110 in relation to the user's real world environment 102. For example, the wearable device 110 may use images of the user's real world environment 102, as well as other sensor data to identify a relative position and orientation of the wearable device 110 from physical objects in the real world environment 102 surrounding the wearable device 110. The 6DOF tracker 512 continually gathers and uses updated sensor data describing movements of the wearable device 110 to determine updated three-dimensional poses of the wearable device 110 that indicate changes in the relative position and orientation of the wearable device 110 from the physical objects in the real world environment 102. The 6DOF tracker 512 provides the three-dimensional pose of the wearable device 110 to the AR application 510 and the wearable device pairing application 526.

The depth system 528 identifies depth of items in the image and generates a dense point cloud. In one example, the depth system 326 includes a depth sensor or a stereo sensor.

The wearable device pairing application 526 detects an image of the machine-readable code 114 (displayed on the display 304 of the mobile device 112) from the optical sensor 514. In response to detecting the machine-readable code 114, the wearable device pairing application 526 accesses pose data from the 6DOF tracker 512. The wearable device pairing application 526 decodes pose data from the machine-readable code 114. In one example, the wearable device pairing application 526 decodes the current VIO pose of the mobile device 112 and metadata (e.g., calibration parameters of the mobile device 112, parameters based on the location of the optical sensor 330 of the mobile device 112 relative to the display 304) from the mobile device 112. The wearable device pairing application 526 determines the relative pose between the wearable device 110 and the mobile device 112 based on the pose data from the wearable device 110 and the pose data from the mobile device 112. Example components of the wearable device pairing application 526 are described further below with respect to FIG. 6.

The graphical processing unit 518 includes a render engine (not shown) that is configured to render a frame of a 3D model of a virtual object based on the virtual content provided by the AR application 510 and the pose of the wearable device 110 (relative to the mobile device 112). In other words, the graphical processing unit 518 uses the three-dimensional pose of the wearable device 110 to generate frames of virtual content to be presented on the display 504. For example, the graphical processing unit 518 uses the three-dimensional pose to render a frame of the virtual content such that the virtual content is presented at an orientation and position in the display 504 to properly augment the user's reality. As an example, the graphical processing unit 518 may use the three-dimensional pose data to render a frame of virtual content such that, when presented on the display 504, the virtual content overlaps/appears anchored to a physical object in the user's real world environment 102. The graphical processing unit 518 generates updated frames of virtual content based on updated three-dimensional poses of the wearable device 110, which reflect changes in the position and orientation of the user in relation to physical objects in the user's real world environment 102.

The graphical processing unit 518 transfers the rendered frame to the display 504. The display controller 520 is positioned as an intermediary between the graphical processing unit 518 and the display 504, receives the image data (e.g., rendered frame) from the graphical processing unit 518, and provides the rendered frame to display 504.

The storage device 506 stores virtual object content 522, relative pose data 524 (e.g., relative pose between mobile device 112 and wearable device 110, common reference frame), and metadata 530. The virtual object content 522 includes, for example, a database of visual references (e.g., images, QR codes) and corresponding virtual content (e.g., three-dimensional model of virtual objects). The relative pose data 524 indicate relative pose between a reference coordinate frame of the mobile device 112 and a reference coordinate frame of the wearable device 110.

The metadata 530 includes, for example, factory calibration parameters of the wearable device 110, calibration parameters based on the location of the optical sensor 514 of the wearable device 110 relative to the display 504. In other examples, the metadata 530) includes VIO calibration parameters related to IMU intrinsics, image sensor intrinsics, IMU-image-sensor extrinsics, and IMU-image-sensor time alignment parameters.

Figure 6:
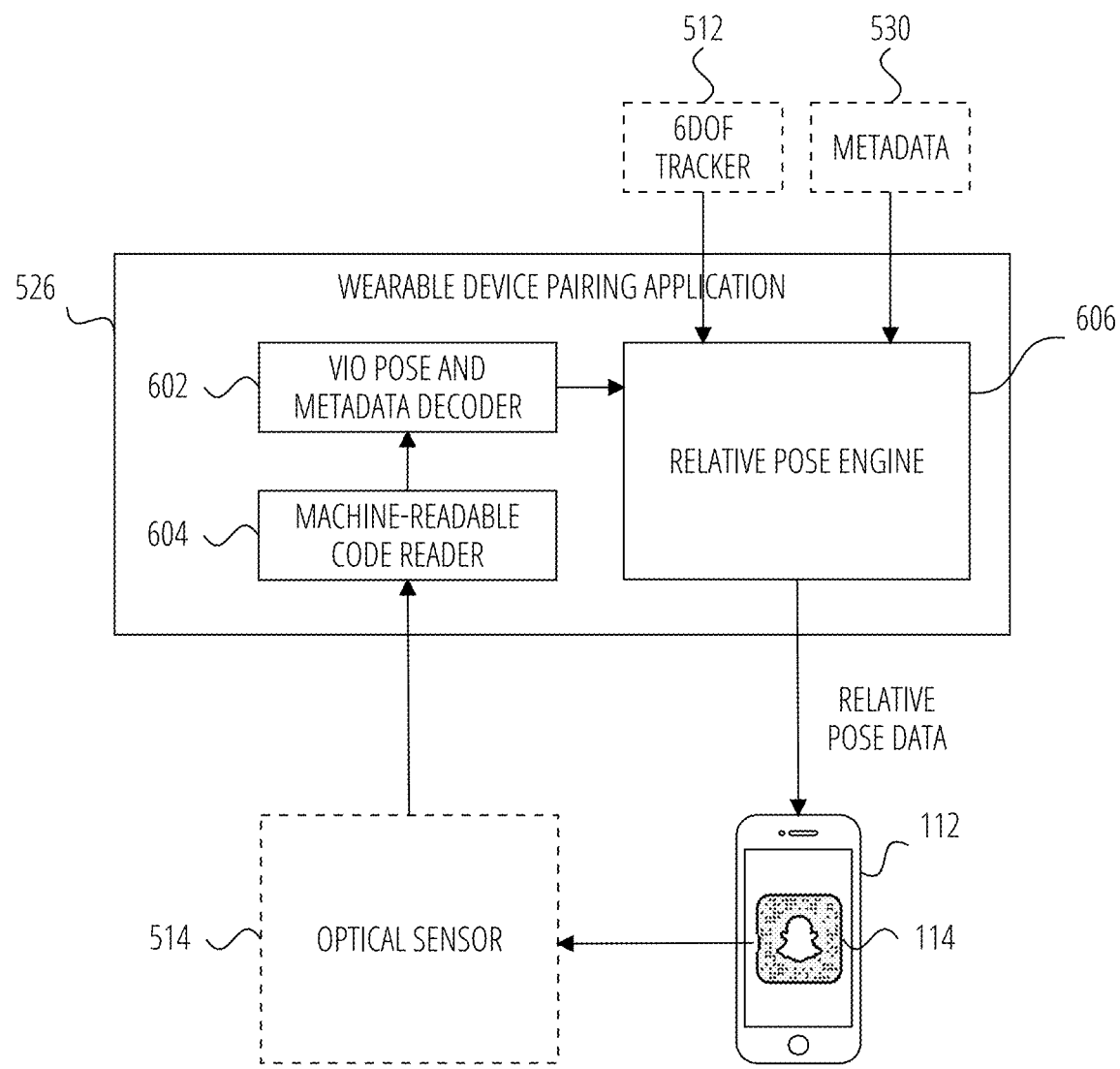
FIG. 6 is a block diagram illustrating a wearable device pairing application in accordance with one example embodiment.

FIG. 6 is a block diagram illustrating the wearable device pairing application 526 in accordance with one example embodiment. The wearable device pairing application 526 includes a VIO pose and metadata decoder 602, a machine-readable code reader 604, and a relative pose engine 606.

The optical sensor 514 of the wearable device 110 captures an image of the machine-readable code 114 displayed on a screen of the mobile device 112. The machine-readable code reader 604 detects the machine-readable code 114 using a QR recognition engine (not shown). Those of ordinary skills in the art will recognize that the machine-readable code 114 is not limited to QR codes but can also include other optical barcodes (e.g., Universal Product Code (UPC) barcodes, Aztec code, Data Matrix, Dataglyph, Maxi-Code, PDF417, Ultra Code). The machine-readable codes are a convenient way to share small pieces of information with users of mobile devices, wearable devices, and other smart devices.

For instance, QR codes are two-dimensional optical barcodes that encode information readable by the wearable device 110. In one example, the machine-readable code 114 includes a QR code that has one or more functional patterns such as a finder pattern used for identification and recognition of the QR code or an alignment pattern used to facilitate decoding. Conventional finder patterns comprise multiple markings that are generic in design such as square marks placed in all corners except the bottom right corner (as is the case with a QR code). These finder patterns are absent aesthetic elements such as curves, non-uniformities, and other stylistic elements and often conform to a particular standard to promote open use of the optical barcode.

The machine-readable code 114 of the present application includes an optical barcode that uses custom or non-standard functional patterns provides users with an aesthetically pleasing, branded barcode that allows for an exclusive experience associated with the optical barcode. For example, an entity logo (e.g., a logo of a company, organization, or individual) can be used as a finder pattern, and in some instances an alignment pattern, to create a branded and exclusive optical barcode that is machine-readable using software provided by the entity. In a specific example, a "snapcode" is an optical barcode that uses the SNAPCHAT® logo as a functional pattern.

After the machine-readable code reader 604 detects the mobile device 112, the VIO pose and metadata decoder 602 decodes data indicating the VIO pose and metadata of the mobile device 112 from the machine-readable code 114. The VIO pose and metadata decoder 602 provides the VIO pose and metadata to the relative pose engine 606.

The relative pose engine 606 retrieves the VIO pose (of the wearable device 110) from 6DOF tracker 512 in response to the machine-readable code reader 604 detecting the machine-readable code 114 or in response to the VIO pose and metadata decoder 602 decoding the pose data from the machine-readable code 114. The VIO pose of the wearable device 110 indicates an instant pose of the wearable device 110 when the wearable device 110 detects the machine-readable code 114 displayed on the mobile device 112. In one example, the relative pose engine 606 accesses metadata 530 from the storage device 506.

The relative pose engine 606 compares the frame of references of the VIO data from mobile device 112 with the frame of reference of the VIO data from wearable device 110 to determine the relative pose between the wearable device 110 and the mobile device 112. In one example, the relative pose engine 606 determines the relative pose between the VIO world coordinate system of the wearable device 110 and the mobile device 112 based on the VIO data of the mobile device 112 and metadata 332, and the VIO data of the wearable device 110 and metadata 530. The relative pose engine 606 can provide the relative pose data to the mobile device 112.

FIG. 7 illustrates an example of the machine-readable code 114 in accordance with one example embodiment. The machine-readable code 114 includes an outer portion 702 and an inner portion 704. The outer portion 702 includes encoded VIO data and metadata 332 of the mobile device 112. The inner portion 704 includes a custom functional pattern (e.g., a shape of a ghost) that is used to estimate an instant pose between the wearable device 110 and the mobile device 112 (based on predefined sizes, relationships, proportions between the outer portion 702 and the inner portion 704).

Figure 8:
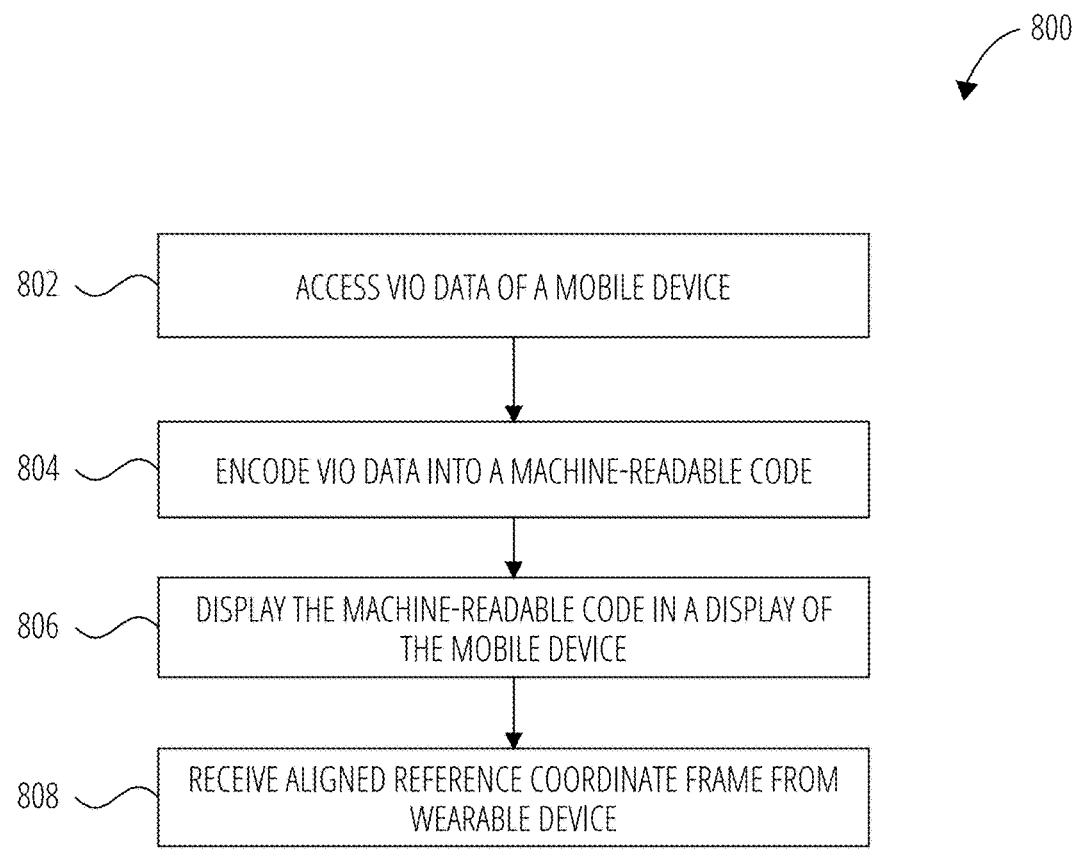
FIG. 8 is a flow diagram illustrating a method for encoding pose data in a machine-readable code in accordance with one example embodiment.

FIG. 8 is a flow diagram illustrating a method 800 for encoding pose data in a machine-readable code in accordance with one example embodiment. Operations in the method 800 may be performed by the mobile device 112, using components (e.g., modules, engines) described above with respect to FIG. 3 and FIG. 4. Accordingly, the method 800 is described by way of example with reference to the mobile device 112. However, it shall be appreciated that at least some of the operations of the method 800 may be deployed on various other hardware configurations or be performed by similar components residing elsewhere.

In block 802, the VIO pose and metadata encoder 402 accesses VIO data of the mobile device 112. In block 804, the VIO pose and metadata encoder 402 encodes the VIO data (and metadata) into the machine-readable code 114. In block 806, the machine-readable code generator 404 generates the machine-readable code 114 and causes the display 304 to display the machine-readable code 114 in a display 304 of the mobile device 112. In block 808, the relative pose receiver 406 receives aligned reference coordinate frame (or relative pose data) from the wearable device 110.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 9:
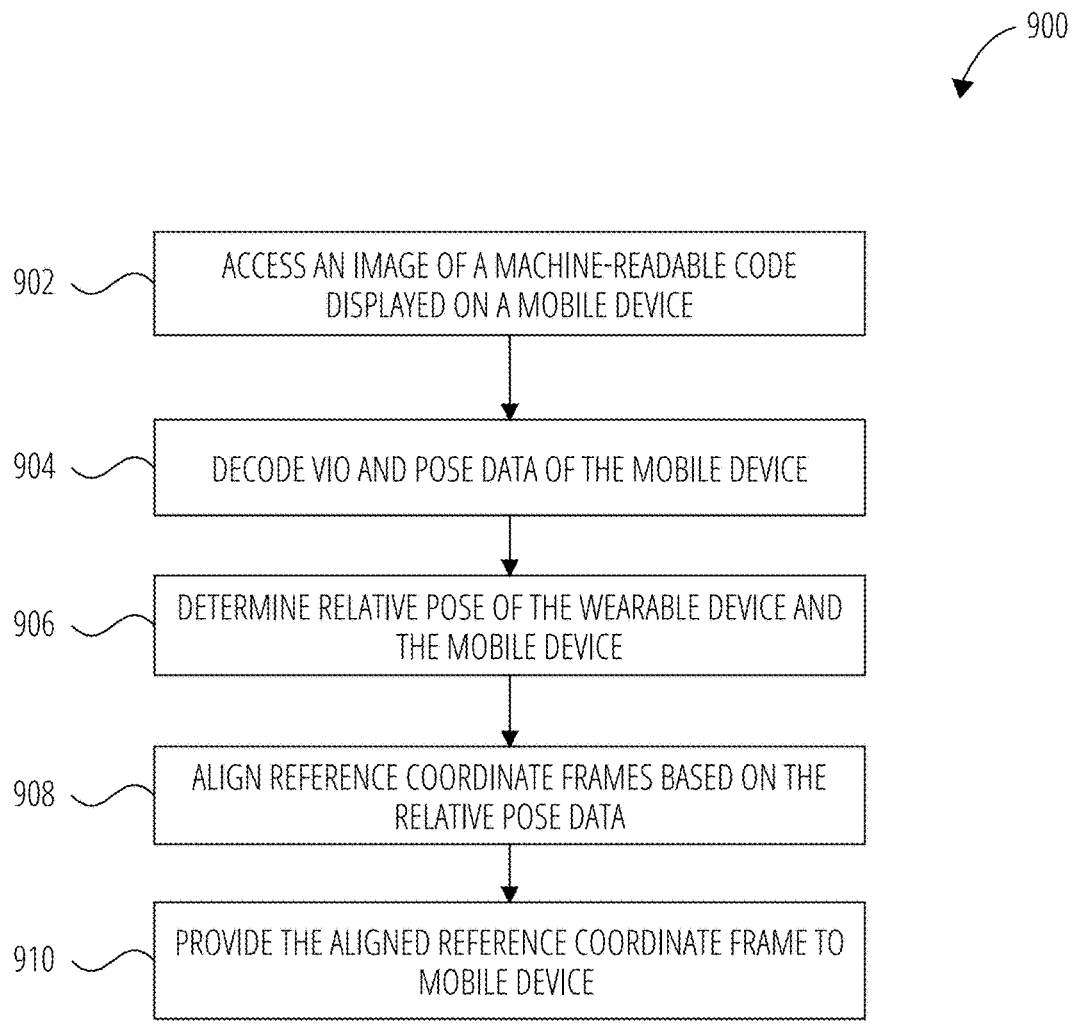
FIG. 9 is a flow diagram illustrating a method for determining reference coordinate frames in accordance with one example embodiment.

FIG. 9 is a flow diagram illustrating a method 900 for determining reference coordinate frames in accordance with one example embodiment. Operations in the method 900 may be performed by the wearable device 110, using components (e.g., modules, engines) described above with respect to FIG. 5 and FIG. 6. Accordingly, the method 900 is described by way of example with reference to the wearable device 110. However, it shall be appreciated that at least some of the operations of the method 900 may be deployed on various other hardware configurations or be performed by similar components residing elsewhere.

In block 902, the machine-readable code reader 604 detects an image of the machine-readable code 114 that is displayed on the mobile device 112. In block 904, the VIO pose and metadata decoder 602 decodes VIO and pose data of the mobile device 112. In block 906, the relative pose engine 606 determines relative pose of the wearable device 110 and the mobile device 112. In block 908, the relative pose engine 606 aligns the reference coordinate frames based on the relative pose data or generates a common coordinate system. In block 910, the relative pose engine 606 provides the aligned reference coordinate frame (or common coordinate system) to the mobile device 112.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

System with Head-Wearable Apparatus

Figure 10:
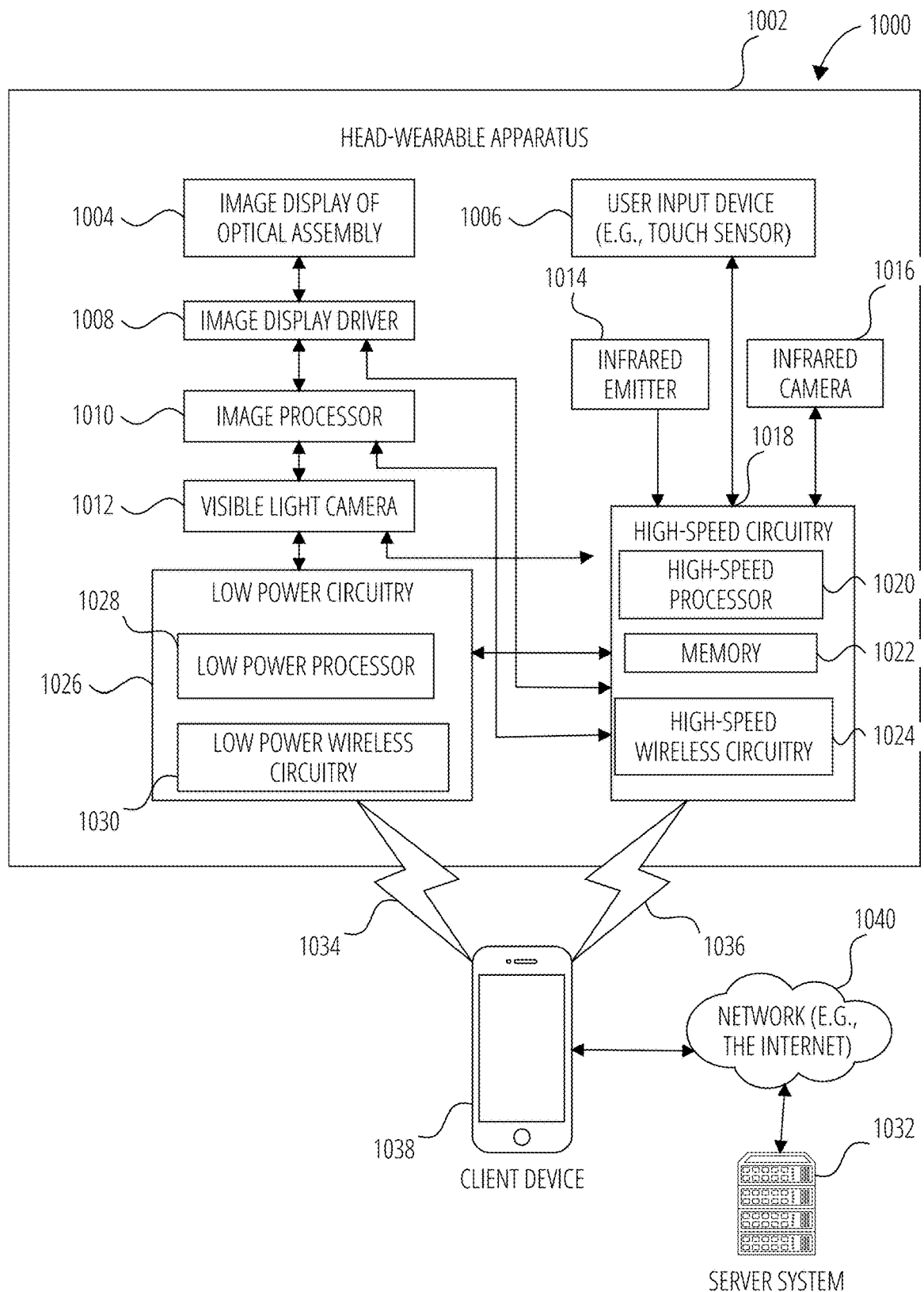
FIG. 10 illustrates a network environment in which a head-wearable device can be implemented according to one example embodiment.

FIG. 10 illustrates a network environment 1000 in which the head-wearable apparatus 1002 can be implemented according to one example embodiment. FIG. 10 is a high-level functional block diagram of an example head-wearable apparatus 1002 communicatively coupled a mobile client device 1038 and a server system 1032 via various network 1040.

head-wearable apparatus 1002 includes a camera, such as at least one of visible light camera 1012, infrared emitter 1014 and infrared camera 1016. The client device 1038 can be capable of connecting with head-wearable apparatus 1002 using both a communication 1034 and a communication 1036. client device 1038 is connected to server system 1032 and network 1040. The network 1040 may include any combination of wired and wireless connections.

The head-wearable apparatus 1002 further includes two image displays of the image display of optical assembly 1004. The two include one associated with the left lateral side and one associated with the right lateral side of the head-wearable apparatus 1002. The head-wearable apparatus 1002 also includes image display driver 1008, image processor 1010, low-power low power circuitry 1026, and high-speed circuitry 1018. The image display of optical assembly 1004 are for presenting images and videos, including an image that can include a graphical user interface to a user of the head-wearable apparatus 1002.

The image display driver 1008 commands and controls the image display of the image display of optical assembly 1004. The image display driver 1008 may deliver image data directly to the image display of the image display of optical assembly 1004 for presentation or may have to convert the image data into a signal or data format suitable for delivery to the image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

As noted above, head-wearable apparatus 1002 includes a frame and stems (or temples) extending from a lateral side of the frame. The head-wearable apparatus 1002 further includes a user input device 1006 (e.g., touch sensor or push button) including an input surface on the head-wearable apparatus 1002. The user input device 1006 (e.g., touch sensor or push button) is to receive from the user an input selection to manipulate the graphical user interface of the presented image.

The components shown in FIG. 10 for the head-wearable apparatus 1002 are located on one or more circuit boards, for example a PCB or flexible PCB, in the rims or temples. Alternatively, or additionally, the depicted components can be located in the chunks, frames, hinges, or bridge of the head-wearable apparatus 1002. Left and right can include digital camera elements such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 1002 includes a memory 1022 which stores instructions to perform a subset or all of the functions described herein. memory 1022 can also include storage device.

As shown in FIG. 10, high-speed circuitry 1018 includes high-speed processor 1020, memory 1022, and high-speed wireless circuitry 1024. In the example, the image display driver 1008 is coupled to the high-speed circuitry 1018 and operated by the high-speed processor 1020 in order to drive the left and right image displays of the image display of optical assembly 1004. high-speed processor 1020 may be any processor capable of managing high-speed communications and operation of any general computing system needed for head-wearable apparatus 1002. The high-speed processor 1020 includes processing resources needed for managing high-speed data transfers on communication 1036 to a wireless local area network (WLAN) using high-speed wireless circuitry 1024. In certain examples, the high-speed processor 1020 executes an operating system such as a LINUX operating system or other such operating system of the head-wearable apparatus 1002 and the operating system is stored in memory 1022 for execution. In addition to any other responsibilities, the high-speed processor 1020 executing a software architecture for the head-wearable apparatus 1002 is used to manage data transfers with high-speed wireless circuitry 1024. In certain examples, high-speed wireless circuitry 1024 is configured to implement Institute of Electrical and Electronic Engineers (IEEE) 1002.11 communication standards, also referred to herein as Wi-Fi. In other examples, other high-speed communications standards may be implemented by high-speed wireless circuitry 1024.

The low power wireless circuitry 1030 and the high-speed wireless circuitry 1024 of the head-wearable apparatus 1002 can include short range transceivers (Bluetooth™) and wireless wide, local, or wide area network transceivers (e.g., cellular or WiFi). The client device 1038, including the transceivers communicating via the communication 1034 and communication 1036, may be implemented using details of the architecture of the head-wearable apparatus 1002, as can other elements of network 1040.

The memory 1022 includes any storage device capable of storing various data and applications, including, among other things, camera data generated by the left and right, infrared camera 1016, and the image processor 1010, as well as images generated for display by the image display driver 1008 on the image displays of the image display of optical assembly 1004. While memory 1022 is shown as integrated with high-speed circuitry 1018, in other examples, memory 1022 may be an independent standalone element of the head-wearable apparatus 1002. In certain such examples, electrical routing lines may provide a connection through a chip that includes the high-speed processor 1020 from the image processor 1010 or low power processor 1028 to the memory 1022. In other examples, the high-speed processor 1020 may manage addressing of memory 1022 such that the low power processor 1028 will boot the high-speed processor 1020 any time that a read or write operation involving memory 1022 is needed.

As shown in FIG. 10, the low power processor 1028 or high-speed processor 1020 of the head-wearable apparatus 1002 can be coupled to the camera (visible light camera 1012; infrared emitter 1014, or infrared camera 1016), the image display driver 1008, the user input device 1006 (e.g., touch sensor or push button), and the memory 1022.

The head-wearable apparatus 1002 is connected with a host computer. For example, the head-wearable apparatus 1002 is paired with the client device 1038 via the communication 1036 or connected to the server system 1032 via the network 1040. server system 1032 may be one or more computing devices as part of a service or network computing system, for example, that include a processor, a memory, and network communication interface to communicate over the network 1040 with the client device 1038 and head-wearable apparatus 1002.

The client device 1038 includes a processor and a network communication interface coupled to the processor. The network communication interface allows for communication over the network 1040, communication 1034 or communication 1036. client device 1038 can further store at least portions of the instructions for generating a binaural audio content in the client device 1038's memory to implement the functionality described herein.

Output components of the head-wearable apparatus 1002 include visual components, such as a display such as a liquid crystal display (LCD), a plasma display panel (PDP), a light emitting diode (LED) display, a projector, or a waveguide. The image displays of the optical assembly are driven by the image display driver 1008. The output components of the head-wearable apparatus 1002 further include acoustic components (e.g., speakers), haptic components (e.g., a vibratory motor), other signal generators, and so forth. The input components of the head-wearable apparatus 1002, the client device 1038, and server system 1032, such as the user input device 1006, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 1002 may optionally include additional peripheral device elements. Such peripheral device elements may include biometric sensors, additional sensors, or display elements integrated with head-wearable apparatus 1002. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over and communication 1036 from the client device 1038 via the low power wireless circuitry 1030 or high-speed wireless circuitry 1024.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

Figure 11:
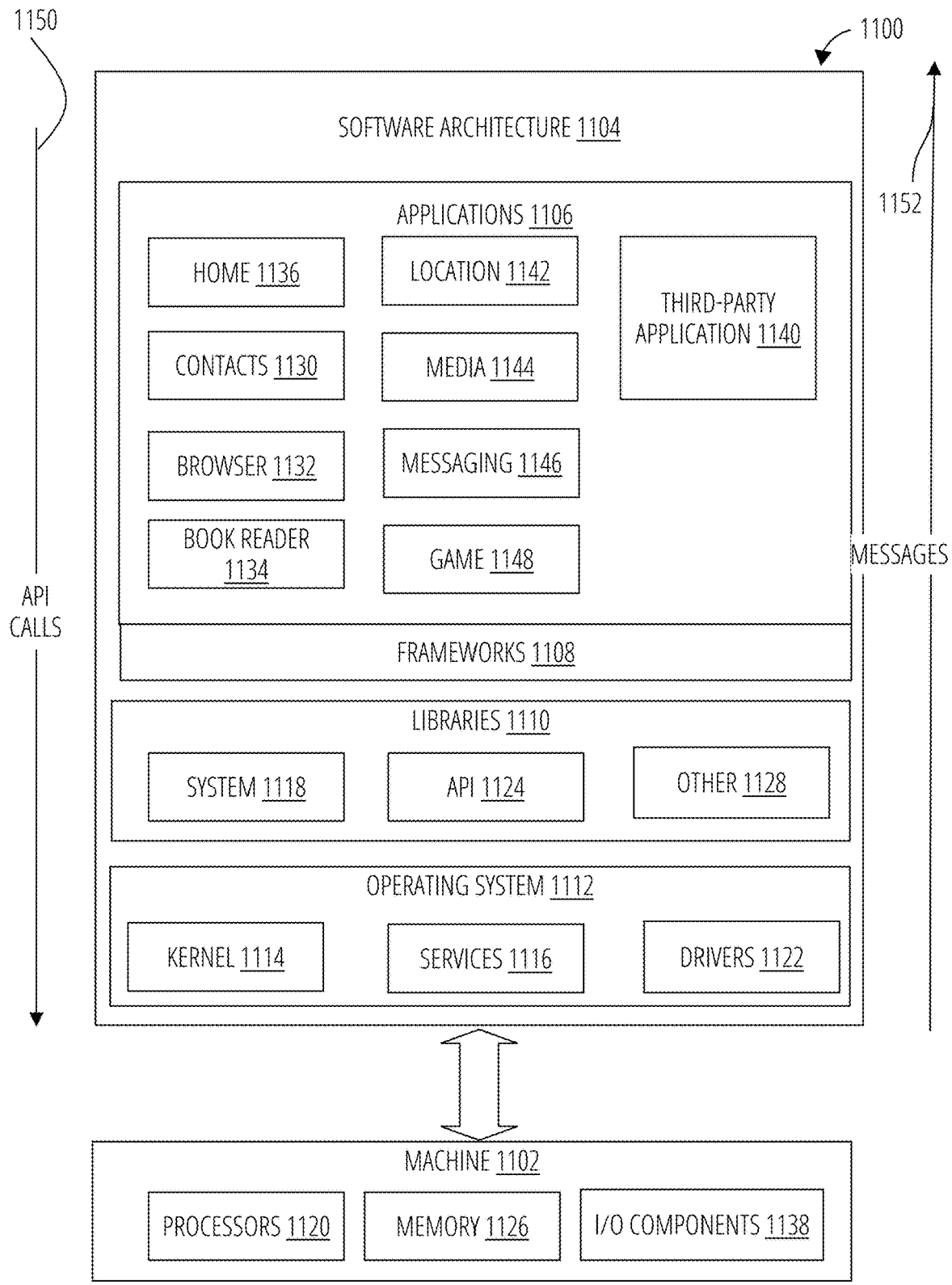
FIG. 11 is block diagram showing a software architecture within which the present disclosure may be implemented, according to an example embodiment.

FIG. 11 is a block diagram 1100 illustrating a software architecture 1104, which can be installed on any one or more of the devices described herein. The software architecture 1104 is supported by hardware such as a machine 1102 that includes Processors 1120, memory 1126, and I/O Components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, Processor management (e.g., scheduling), Component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., Universal Serial Bus (USB) drivers), WI-FIR drivers, audio drivers, power management drivers, and so forth.

The libraries 1110 provide a low-level common infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a high-level common infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example embodiment, the applications 1106 may include a home application 1136, a contacts application 1130, a browser application 1132, a book reader application 1134, a location application 1142, a media application 1144, a messaging application 1146, a game application 1148, and a broad assortment of other applications such as a third-party application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the third-party application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1140 can invoke the API calls 1150 provided by the operating system 1112 to facilitate functionality described herein.

Figure 12:
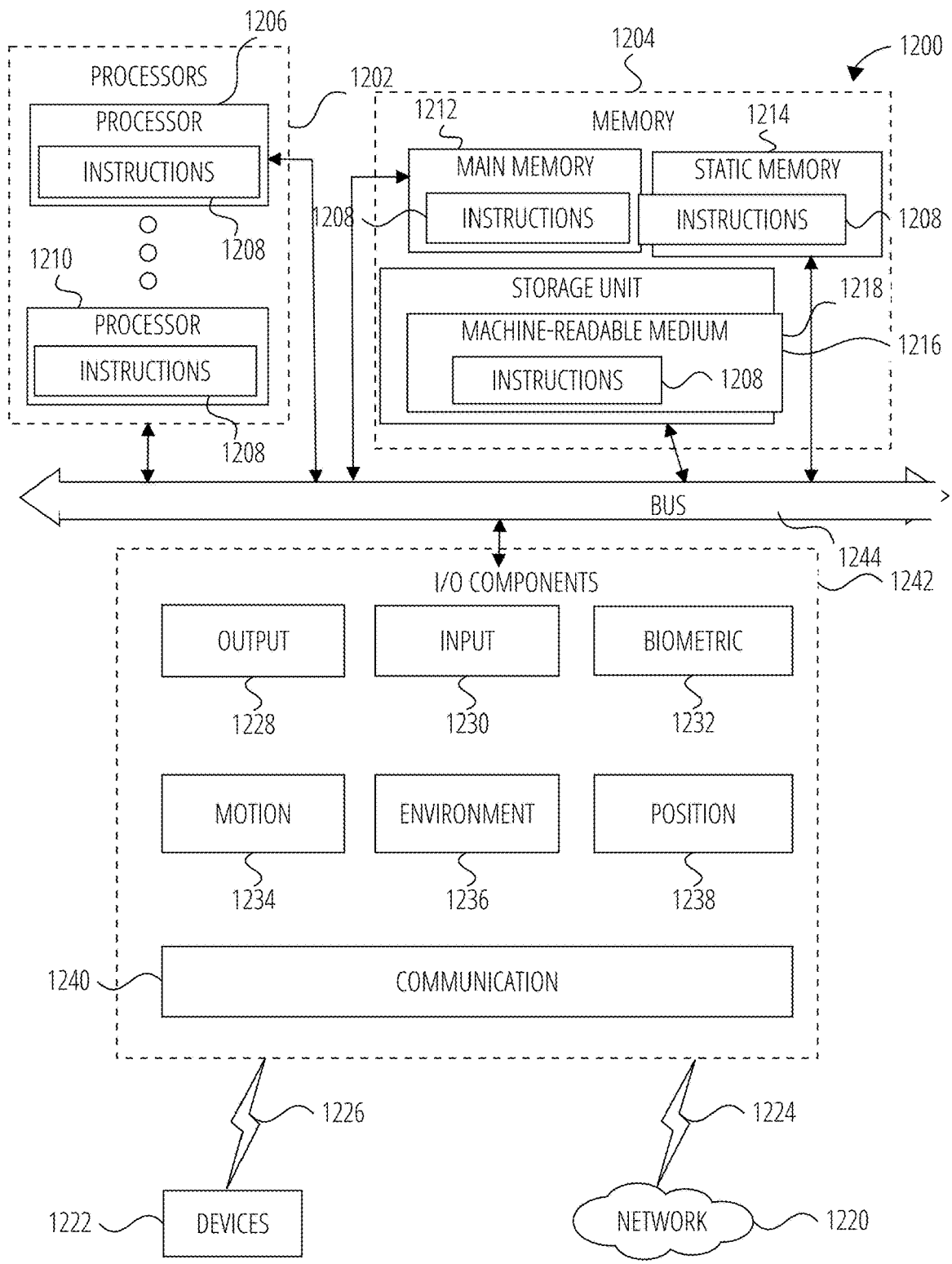
FIG. 12 is a diagrammatic representation of a machine in the form of a computer system within which a set of instructions may be executed for causing the machine to perform any one or more of the methodologies discussed herein, according to one example embodiment.

FIG. 12 is a diagrammatic representation of the machine 1200 within which instructions 1208 (e.g., software, a program, an application, an applet, an app, or other executable code) for causing the machine 1200 to perform any one or more of the methodologies discussed herein may be executed. For example, the instructions 1208 may cause the machine 1200 to execute any one or more of the methods described herein. The instructions 1208 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is illustrated, the term "machine" shall also be taken to include a collection of machines that individually or jointly execute the instructions 1208 to perform any one or more of the methodologies discussed herein.

The machine 1200 may include Processors 1202, memory 1204, and I/O Components 1242, which may be configured to communicate with each other via a bus 1244. In an example embodiment, the Processors 1202 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1206 and a Processor 1210 that execute the instructions 1208. The term "Processor" is intended to include multi-core Processors that may comprise two or more independent Processors (sometimes referred to as "cores") that may execute instructions contemporaneously. Although FIG. 12 shows multiple Processors 1202, the machine 1200 may include a single Processor with a single core, a single Processor with multiple cores (e.g., a multi-core Processor), multiple Processors with a single core, multiple Processors with multiples cores, or any combination thereof.

The memory 1204 includes a main memory 1212, a static memory 1214, and a storage unit 1216, both accessible to the Processors 1202 via the bus 1244. The main memory 1204, the static memory 1214, and storage unit 1216 store the instructions 1208 embodying any one or more of the methodologies or functions described herein. The instructions 1208 may also reside, completely or partially, within the main memory 1212, within the static memory 1214, within machine-readable medium 1218 within the storage unit 1216, within at least one of the Processors 1202 (e.g., within the Processor's cache memory), or any suitable combination thereof, during execution thereof by the machine 1200.

The I/O Components 1242 may include a wide variety of Components to receive input, provide output, produce output, transmit information, exchange information, capture measurements, and so on. The specific I/O Components 1242 that are included in a particular machine will depend on the type of machine. For example, portable machines such as mobile phones may include a touch input device or other such input mechanisms, while a headless server machine will likely not include such a touch input device. It will be appreciated that the I/O Components 1242 may include many other Components that are not shown in FIG. 12. In various example embodiments, the I/O Components 1242 may include output Components 1228 and input Components 1230. The output Components 1228 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 1230 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 1242 may include biometric Components 1232, motion Components 1234, environmental Components 1236, or position Components 1238, among a wide array of other Components. For example, the biometric Components 1232 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 1234 include acceleration sensor Components (e.g., accelerometer), gravitation sensor Components, rotation sensor Components (e.g., gyroscope), and so forth. The environmental Components 1236 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 1238 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 1242 further include communication Components 1240 operable to couple the machine 1200 to a network 1220 or devices 1222 via a coupling 1224 and a coupling 1226, respectively. For example, the communication Components 1240) may include a network interface Component or another suitable device to interface with the network 1220. In further examples, the communication Components 1240 may include wired communication Components, wireless communication Components, cellular communication Components, Near Field Communication (NFC) Components, Bluetooth® Components (e.g., Bluetooth® Low Energy), Wi-Fi® Components, and other communication Components to provide communication via other modalities. The devices 1222 may be another machine or any of a wide variety of peripheral devices (e.g., a peripheral device coupled via a USB).

Moreover, the communication Components 1240 may detect identifiers or include Components operable to detect identifiers. For example, the communication Components 1240 may include Radio Frequency Identification (RFID) tag reader Components. NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 1240, such as location via Internet Protocol (IP) geolocation, location via Wi-Fi® signal triangulation, location via detecting an NFC beacon signal that may indicate a particular location, and so forth.

The various memories (e.g., memory 1204, main memory 1212, static memory 1214, and/or memory of the Processors 1202) and/or storage unit 1216 may store one or more sets of instructions and data structures (e.g., software) embodying or used by any one or more of the methodologies or functions described herein. These instructions (e.g., the instructions 1208), when executed by Processors 1202, cause various operations to implement the disclosed embodiments.

The instructions 1208 may be transmitted or received over the network 1220, using a transmission medium, via a network interface device (e.g., a network interface Component included in the communication Components 1240) and using any one of a number of well-known transfer protocols (e.g., hypertext transfer protocol (HTTP)). Similarly, the instructions 1208 may be transmitted or received using a transmission medium via the coupling 1226 (e.g., a peer-to-peer coupling) to the devices 1222.

As used herein, the terms "Machine-Storage Medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of Machine-Storage Media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "Machine-Storage Media," "computer-storage media," and "device-storage media" specifically exclude carrier waves, modulated data signals, and other such media, at least some of which are covered under the term "signal medium" discussed below.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "Computer-Readable Medium," and "device-readable medium" mean the same thing and may be used interchangeably in this disclosure. The terms are defined to include both Machine-Storage Media and transmission media. Thus, the terms include both storage devices/media and carrier waves/modulated data signals.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Examples

Example 1 is a method comprising: accessing first pose data from a first Visual Inertial Odometry (VIO) system of a first device; accessing, using a camera of a first device, an image of a machine-readable code that is displayed on a display of a second device, the machine-readable code being encoded by the second device with second pose data from a second VIO system of the second device; decoding, at the first device, the second pose data from the machine-readable code; and determining, at the first device, a relative pose between the first device and the second device based on the first pose data and the second pose data.

Example 2 includes the method of example 1, wherein the second device is configured to: encode the second pose data and metadata generated by the second VIO system with the machine-readable code; and display the image of the machine-readable code in the second display of the second device.

Example 3 includes the method of example 2, wherein the machine-readable code includes a QR code, an outer portion of the QR code comprising encoded first pose data and metadata, an inner portion of the QR code comprising a predefined second pattern having a predefined size with respect to the outer portion, wherein the metadata indicates calibrated relationship parameters of a location of a camera of the second device and the display of the second device.

Example 4 includes the method of example 1, wherein determining the relative pose further comprises: identifying a first reference coordinate frame of the first VIO system based on the first pose data; identifying a second reference coordinate frame of the second VIO system based on the second pose data; and detecting the relative pose based on an alignment of the first reference coordinate frame with the second reference coordinate frame.

Example 5 includes the method of example 1, wherein determining the relative pose further comprises: identifying a first reference coordinate frame of the first VIO system based on the first pose data; identifying a second reference coordinate frame of the second VIO system based on the second pose data; and forming a world reference coordinate system based on the first reference coordinate frame and the second reference coordinate frame.

Example 6 includes the method of example 1, further comprising: displaying, in a display of the first device, a first virtual object based on the first pose data of the first device and the relative pose.

Example 7 includes the method of example 6, further comprising: communicating the relative pose to the second device, and wherein the second device is configured to display a second virtual object based on the second pose data of the second device and the relative pose, wherein the second virtual object corresponds to the first virtual object.

Example 8 includes the method of example 1, wherein the first device is configured to identify a first timestamp corresponding to the first pose data of the first device, wherein the second device generates a second timestamp in response to accessing the second pose data of the second device, and wherein the method comprises: determining that a difference between the first timestamp and the second timestamp is within a preset threshold; and in response to the difference between the first timestamp and the second timestamp being within the preset threshold, determining the relative pose between the first device and the second device.

Example 9 includes the method of example 1, wherein the first device comprises a wearable device with a transparent display, the wearable device configured to operate a first augmented reality application.

Example 10 includes the method of example 1, wherein the second device comprises a handheld mobile device with a non-transparent touchscreen, the handheld mobile device configured to operate a second augmented reality application.

Example 11 is a computing apparatus comprising: a processor; and a memory storing instructions that, when executed by the processor, configure the apparatus to: access first pose data from a first Visual Inertial Odometry (VIO) system of a first device; access, using a camera of a first device, an image of a machine-readable code that is displayed on a display of a second device, the machine-readable code being encoded by the second device with second pose data from a second VIO system of the second device; decode, at the first device, the second pose data from the machine-readable code; and determine, at the first device, a relative pose between the first device and the second device based on the first pose data and the second pose data.

Example 12 includes the computing apparatus of example 11, wherein the second device is configured to: encode the second pose data and metadata generated by the second VIO system with the machine-readable code; and display the image of the machine-readable code in the second display of the second device.

Example 13 includes the computing apparatus of example 12, wherein the machine-readable code includes a QR code, an outer portion of the QR code comprising encoded first pose data and metadata, an inner portion of the QR code comprising a predefined second pattern having a predefined size with respect to the outer portion, wherein the metadata indicates calibrated relationship parameters of a location of a camera of the second device and the display of the second device.

Example 14 includes the computing apparatus of example 11, wherein determining the relative pose further comprises: identify a first reference coordinate frame of the first VIO system based on the first pose data; identify a second reference coordinate frame of the second VIO system based on the second pose data; and detect the relative pose based on an alignment of the first reference coordinate frame with the second reference coordinate frame.

Example 15 includes the computing apparatus of example 11, wherein determining the relative pose further comprises: identify a first reference coordinate frame of the first VIO system based on the first pose data; identify a second reference coordinate frame of the second VIO system based on the second pose data; and form a world reference coordinate system based on the first reference coordinate frame and the second reference coordinate frame.

Example 16 includes the computing apparatus of example 11, wherein the instructions further configure the apparatus to: display, in a display of the first device, a first virtual object based on the first pose data of the first device and the relative pose.

Example 17 includes the computing apparatus of example 16, wherein the instructions further configure the apparatus to: communicate the relative pose to the second device, and wherein the second device is configured to display a second virtual object based on the second pose data of the second device and the relative pose, wherein the second virtual object corresponds to the first virtual object.

Example 18 includes the computing apparatus of example 11, wherein the first device is configured to identify a first timestamp corresponding to the first pose data of the first device, wherein the second device generates a second timestamp in response to accessing the second pose data of the second device, and wherein the method comprises: determine that a difference between the first timestamp and the second timestamp is within a preset threshold; and in response to the difference between the first timestamp and the second timestamp being within the preset threshold, determine the relative pose between the first device and the second device.

Example 19 includes the computing apparatus of example 11, wherein the first device comprises a wearable device with a transparent display, the wearable device configured to operate a first augmented reality application, wherein the second device comprises a handheld mobile device with a non-transparent touchscreen, the handheld mobile device configured to operate a second augmented reality application.

Example 20 is a non-transitory computer-readable storage medium, the computer-readable storage medium including instructions that when executed by a computer, cause the computer to: access first pose data from a first Visual Inertial Odometry (VIO) system of a first device; access, using a camera of a first device, an image of a machine-readable code that is displayed on a display of a second device, the machine-readable code being encoded by the second device with second pose data from a second VIO system of the second device; decode, at the first device, the second pose data from the machine-readable code; and determine, at the first device, a relative pose between the first device and the second device based on the first pose data and the second pose data.

What is claimed is:

1. A method comprising:
accessing first pose data from a first Visual Inertial Odometry (VIO) system of a first device;
accessing, using a camera of a first device, an image of a machine-readable code that is displayed on a display of a second device, the machine-readable code being encoded by the second device with second pose data from a second VIO system of the second device;
decoding, at the first device, the second pose data from the machine-readable code; and
determining, at the first device, a relative pose between the first device and the second device based on the first pose data and the second pose data.

2. The method of claim 1, wherein the second device is configured to:
encode the second pose data and metadata generated by the second VIO system with the machine-readable code; and
display the image of the machine-readable code in the second display of the second device.

3. The method of claim 2, wherein the machine-readable code includes a QR code, an outer portion of the QR code comprising encoded first pose data and metadata, an inner portion of the QR code comprising a predefined second pattern having a predefined size with respect to the outer portion,
wherein the metadata indicates calibrated relationship parameters of a location of a camera of the second device and the display of the second device.

4. The method of claim 1, wherein determining the relative pose further comprises:
identifying a first reference coordinate frame of the first VIO system based on the first pose data;
identifying a second reference coordinate frame of the second VIO system based on the second pose data; and
detecting the relative pose based on an alignment of the first reference coordinate frame with the second reference coordinate frame.

5. The method of claim 1, wherein determining the relative pose further comprises:
identifying a first reference coordinate frame of the first VIO system based on the first pose data;
identifying a second reference coordinate frame of the second VIO system based on the second pose data; and
forming a world reference coordinate system based on the first reference coordinate frame and the second reference coordinate frame.

6. The method of claim 1, further comprising:
displaying, in a display of the first device, a first virtual object based on the first pose data of the first device and the relative pose.

7. The method of claim 6, further comprising:
communicating the relative pose to the second device, and
wherein the second device is configured to display a second virtual object based on the second pose data of the second device and the relative pose,
wherein the second virtual object corresponds to the first virtual object.

8. The method of claim 1, wherein the first device is configured to identify a first timestamp corresponding to the first pose data of the first device,
wherein the second device generates a second timestamp in response to accessing the second pose data of the second device, and
wherein the method comprises:
determining that a difference between the first timestamp and the second timestamp is within a preset threshold; and
in response to the difference between the first timestamp and the second timestamp being within the preset threshold, determining the relative pose between the first device and the second device.

9. The method of claim 1, wherein the first device comprises a wearable device with a transparent display, the wearable device configured to operate a first augmented reality application.

10. The method of claim 1, wherein the second device comprises a handheld mobile device with a non-transparent touchscreen, the handheld mobile device configured to operate a second augmented reality application.

11. A computing apparatus comprising:
a processor; and
a memory storing instructions that, when executed by the processor, configure the apparatus to:
access first pose data from a first Visual Inertial Odometry (VIO) system of a first device;
access, using a camera of a first device, an image of a machine-readable code that is displayed on a display of a second device, the machine-readable code being encoded by the second device with second pose data from a second VIO system of the second device;
decode, at the first device, the second pose data from the machine-readable code; and
determine, at the first device, a relative pose between the first device and the second device based on the first pose data and the second pose data.

12. The computing apparatus of claim 11, wherein the second device is configured to:
- encode the second pose data and metadata generated by the second VIO system with the machine-readable code; and
- display the image of the machine-readable code in the second display of the second device.

13. The computing apparatus of claim 12, wherein the machine-readable code includes a QR code, an outer portion of the QR code comprising encoded first pose data and metadata, an inner portion of the QR code comprising a predefined second pattern having a predefined size with respect to the outer portion,
- wherein the metadata indicates calibrated relationship parameters of a location of a camera of the second device and the display of the second device.

14. The computing apparatus of claim 11, wherein determining the relative pose further comprises:
- identify a first reference coordinate frame of the first VIO system based on the first pose data;
- identify a second reference coordinate frame of the second VIO system based on the second pose data; and
- detect the relative pose based on an alignment of the first reference coordinate frame with the second reference coordinate frame.

15. The computing apparatus of claim 11, wherein determining the relative pose further comprises:
- identify a first reference coordinate frame of the first VIO system based on the first pose data;
- identify a second reference coordinate frame of the second VIO system based on the second pose data; and
- form a world reference coordinate system based on the first reference coordinate frame and the second reference coordinate frame.

16. The computing apparatus of claim 11, wherein the instructions further configure the apparatus to:
- display, in a display of the first device, a first virtual object based on the first pose data of the first device and the relative pose.

17. The computing apparatus of claim 16, wherein the instructions further configure the apparatus to:
- communicate the relative pose to the second device, and
- wherein the second device is configured to display a second virtual object based on the second pose data of the second device and the relative pose,
- wherein the second virtual object corresponds to the first virtual object.

18. The computing apparatus of claim 11, wherein the first device is configured to identify a first timestamp corresponding to the first pose data of the first device,
- wherein the second device generates a second timestamp in response to accessing the second pose data of the second device, and
- wherein the method comprises:
- determine that a difference between the first timestamp and the second timestamp is within a preset threshold; and
- in response to the difference between the first timestamp and the second timestamp being within the preset threshold, determine the relative pose between the first device and the second device.

19. The computing apparatus of claim 11, wherein the first device comprises a wearable device with a transparent display, the wearable device configured to operate a first augmented reality application,
- wherein the second device comprises a handheld mobile device with a non-transparent touchscreen, the handheld mobile device configured to operate a second augmented reality application.

20. A non-transitory computer-readable storage medium, the computer-readable storage medium including instructions that when executed by a computer, cause the computer to:
- access first pose data from a first Visual Inertial Odometry (VIO) system of a first device;
- access, using a camera of a first device, an image of a machine-readable code that is displayed on a display of a second device, the machine-readable code being encoded by the second device with second pose data from a second VIO system of the second device;
- decode, at the first device, the second pose data from the machine-readable code; and
- determine, at the first device, a relative pose between the first device and the second device based on the first pose data and the second pose data.

* * * * *